United States Patent
Tomioka et al.

(10) Patent No.: US 12,415,736 B2
(45) Date of Patent: Sep. 16, 2025

(54) METHOD FOR CONTROLLING FRESH WATER GENERATION APPARATUS BY ESTIMATING FILTRATION PROPERTY, METHOD FOR DETERMINING PRESENCE OF TROUBLE IN FRESH WATER GENERATION APPARATUS, FRESH WATER GENERATION APPARATUS, PROGRAM FOR OPERATING FRESH WATER GENERATION APPARATUS, PROGRAM FOR DETERMINING PRESENCE OF TROUBLE IN FRESH WATER GENERATION APPARATUS, AND RECORDING MEDIUM

(71) Applicant: Toray Industries, Inc., Tokyo (JP)

(72) Inventors: Kazunori Tomioka, Otsu (JP); Kazuki Hagawa, Otsu (JP); Hiroshi Hamada, Otsu (JP)

(73) Assignee: Toray Industries, Inc., Tokyo (JP)

( * ) Notice: Subject to any disclaimer, the term of this patent is extended or adjusted under 35 U.S.C. 154(b) by 555 days.

(21) Appl. No.: 17/798,982

(22) PCT Filed: Feb. 12, 2021

(86) PCT No.: PCT/JP2021/005268
§ 371 (c)(1),
(2) Date: Aug. 11, 2022

(87) PCT Pub. No.: WO2021/162093
PCT Pub. Date: Aug. 19, 2021

(65) Prior Publication Data
US 2023/0174390 A1  Jun. 8, 2023

(30) Foreign Application Priority Data

Feb. 14, 2020 (JP) .................................. 2020-023071
Mar. 27, 2020 (JP) .................................. 2020-057377

(51) Int. Cl.
*C02F 1/00* (2023.01)
*B01D 61/58* (2006.01)
(Continued)

(52) U.S. Cl.
CPC .............. *C02F 1/008* (2013.01); *B01D 61/58* (2013.01); *B01D 65/10* (2013.01); *C02F 1/44* (2013.01);
(Continued)

(58) Field of Classification Search
None
See application file for complete search history.

(56) References Cited

U.S. PATENT DOCUMENTS

| 2010/0250154 A1 | 9/2010 | Hanada et al. | |
| 2013/0206699 A1* | 8/2013 | Scheu | B01D 24/48 210/660 |

(Continued)

FOREIGN PATENT DOCUMENTS

| JP | 2001062255 A | 3/2001 |
| JP | 2001129365 A | 5/2001 |

(Continued)

OTHER PUBLICATIONS

Indian Examination Report for Indian Application No. 202247045998, dated June 14, 2023 with translation, 7 pages.
(Continued)

*Primary Examiner* — Richard C Gurtowski
(74) *Attorney, Agent, or Firm* — Buchanan Ingersoll & Rooney PC

(57) ABSTRACT

The present invention relates to a method of controlling a fresh-water production apparatus for treating a raw water in stages by N-stage (N is a natural number of 2 or larger) water treatment methods, the method including: a filtration-characteristic prediction step; a filtration-characteristic deviation
(Continued)

assessment step; a filtration-characteristic deviation assessment step; a cyclic prediction calculation step; a control condition recording step; a cyclic prediction calculation step; and a control condition recording step, in which the fresh-water production apparatus is controlled on the basis of the control condition recording step for the (n−1)-th stage water treatment method and the control condition recording step for the n-th stage water treatment method.

31 Claims, 4 Drawing Sheets

(51) Int. Cl.
    *B01D 65/10*    (2006.01)
    *C02F 1/44*    (2023.01)

(52) U.S. Cl.
    CPC .. *C02F 2209/001* (2013.01); *C02F 2209/006* (2013.01); *C02F 2209/44* (2013.01); *C02F 2301/08* (2013.01); *C02F 2303/16* (2013.01)

(56) References Cited

U.S. PATENT DOCUMENTS

| | | | |
|---|---|---|---|
| 2016/0002072 A1 | 1/2016 | Tokunaga et al. | |
| 2016/0046503 A1* | 2/2016 | Hoek | B01D 61/22 |
| | | | 210/741 |

FOREIGN PATENT DOCUMENTS

| | | |
|---|---|---|
| JP | 2006326473 A | 12/2006 |
| JP | WO2009054506 A1 | 4/2009 |
| JP | 2014161797 A | 9/2014 |
| JP | 2019018191 A | 2/2019 |
| JP | 2020023071 A | 2/2020 |
| WO | 2009054506 A1 | 3/2011 |
| WO | 2021162093 A1 | 8/2021 |

OTHER PUBLICATIONS

International Preliminary Report on Patentability for International Application No. PCT/JP2021/005268, dated Aug. 11, 2022, 8 pages.
International Search Report and Written Opinion for International Application No. PCT/JP2021/005268, dated Apr. 13, 2021, 10 pages.
Japanese Written Description of Circumstances for Accelerated Examination for Japanese Application No. 2021-517731, dated Jul. 30, 2021, with English translation, 19 pages.

* cited by examiner

METHOD FOR CONTROLLING FRESH WATER GENERATION APPARATUS BY ESTIMATING FILTRATION PROPERTY, METHOD FOR DETERMINING PRESENCE OF TROUBLE IN FRESH WATER GENERATION APPARATUS, FRESH WATER GENERATION APPARATUS, PROGRAM FOR OPERATING FRESH WATER GENERATION APPARATUS, PROGRAM FOR DETERMINING PRESENCE OF TROUBLE IN FRESH WATER GENERATION APPARATUS, AND RECORDING MEDIUM

CROSS REFERENCE TO RELATED APPLICATIONS

This application is the U.S. National Phase application of PCT/JP2021/005268, filed Feb. 12, 2021, which claims priority to Japanese Patent Application No. 2020-023071, filed Feb. 14, 2020 and Japanese Patent Application No. 2020-057377, filed Mar. 27, 2020, the disclosures of these applications being incorporated herein by reference in their entireties for all purposes.

FIELD OF THE INVENTION

The present invention relates to a method of controlling a fresh-water production apparatus for obtaining treated water by treating natural water, such as river water, lake water, or seawater, sewage, wastewater, or industrial wastewater, on the basis of a prediction of filtration characteristics of the fresh-water production apparatus, a trouble assessment method for a fresh-water production apparatus, a fresh-water production apparatus, an operation program for a fresh-water production apparatus, a trouble assessment program for a fresh-water production apparatus, and a storage medium.

BACKGROUND OF THE INVENTION

There are water treatment methods including settling/floatation separation, an anaerobic treatment method, a sand filtration method, a membrane filtration method, an ion exchange method, a physical adsorption method, and an oxidation/disinfection method, and one or more of these water treatment methods are selected or used in combination in accordance with the properties of the raw water and use of the water to be produced.

In recent years, membrane separation methods are increasingly used in various fields because of advantages thereof including energy/space saving and improvements in the quality of treated water. Examples thereof include application of microfiltration membranes or ultrafiltration membranes to water purification processes for producing industrial water or service water from river water, groundwater, or treated sewage and application of reverse osmosis membranes to seawater desalination. Furthermore, a membrane separation method is coming to be increasingly used in which those separation membranes are used in combination, for example, in such a manner that raw water is filtered with an ultrafiltration membrane and the resultant permeate is treated with a reverse osmosis membrane to thereby obtain clean product water.

In the membrane filtration of raw water to be treated, the accumulation of fouling substances on the membrane surface and in pores of the membrane (membrane fouling) proceeds as the amount of the treated water increases, resulting in a change in filtration characteristics, such as a decrease in filtration rate or an increase in filtration pressure.

In the case where the separation membrane is of the hollow-fiber module type, the separation membrane is subjected to physical washing such as: air washing in which bubbles are introduced to the raw-water side of the separation membrane to cause the separation membrane to oscillate and come into contact with itself, thereby scraping away the fouling substances from the membrane surface; or a back-pressure washing (backwashing) in which the treated water or clean water is forcedly passed with pressure in the direction opposite from the direction of the filtration with the separation membrane, thereby removing the fouling substances adherent to the surface of the separation membrane and to the inside of the membrane pores. In addition, at a frequency of once a day or once every several days, chemical-enhanced backwashing (CEB) is performed in which backwashing is conducted using water containing a chemical and the separation membrane is then immersed in a chemical for about tens of minutes.

Meanwhile, the membrane separation/activated sludge process, which is used mainly in sewage treatments, includes a treatment step in which a biological treatment is performed in a biological reaction vessel and the activated sludge is subjected to solid/liquid separation using, for example, a filtration membrane immersed in the reaction vessel, thereby obtaining clean treated water. In this treatment step, solid matter, such as some of the activated sludge itself and foreign matter present in the raw water flowing into the reaction vessel, adheres to the surface of the separation membrane and the substances which have adhered cause an increase in membrane filtration resistance. Because of this, in the membrane separation/activated sludge process, filtration is conducted while removing the adherent substances from the separation membrane surface in order to prevent the filtration efficiency from decreasing, by diffusing air or the like with air diffusion pipes disposed under the filtration membrane and thereby producing a separation-membrane-vibrating effect and a stirring effect due to the resultant air bubbles and ascending flows.

Moreover, also in the reverse osmosis membrane which is used mainly for seawater desalination and in the case of further filtering the membrane-treated water, the apparatus is generally operated while preventing or inhibiting fouling, for example, by injecting a chemical such as a scale inhibitor or a bactericide as a measure against fouling or by stopping the filtration and subjecting the upstream portion of the separation membrane to physical washing (flushing).

However, even with such measures, unremoved fouling substances accumulate. In case where the accumulation causes the filtration characteristics to reach a reference value, it is necessary to conduct chemical cleaning in which the operation is stopped and the separation membrane is cleaned with a high-concentration chemical in an immersion time.

For cleaning the separation membrane with a chemical, it is necessary to stop the operation and conduct chemical cleaning in which the separation membrane is cleaned with a high-concentration chemical in an immersion time. In case where this chemical cleaning is conducted highly frequently, not only the stops of operation result in a decrease in water production amount but also problems arise, such as the deterioration of the separation membrane due to the chemical and a cost increase due to the chemical cleaning. Hence, the fresh-water production apparatus is generally operated so that the chemical cleaning is conducted at intervals which are as long as possible.

Patent Document 1 describes a technique for predicting changes in filtration flow rate using a plurality of operation values in accordance with changes in the raw water to be treated. Patent Document 2 describes a technique for predicting the timing of performing chemical cleaning by predicting the filtration characteristics of the separation membrane using the contents of components of the raw water to be treated.

However, these techniques each presume the timing of performing the chemical cleaning of the separation membrane by evaluating the degree of fouling of the raw water to be treated and predicting changes of the fresh-water production apparatus itself. Those patent documents do not show any method of assessing or solving troubles during operation in case where the raw water to be treated fluctuates in quality or the filtration characteristics fluctuate due to improper operation conditions, and there have been cases where it is difficult to continue a long-term stable operation in accordance with the circumstances.

Meanwhile, in a fresh-water production apparatus including a combination of separation membranes, it is necessary to operate the apparatus while assessing the filtration characteristics of each filtration membrane. Patent Document 3 describes a technique in which the filtration time for a preceding filtration membrane is changed in accordance with the quality of the raw water to be treated and the filtration rate for a succeeding separation membrane is controlled in accordance with the degree in which the filtration time has been changed. However, the quality of the raw water is the only factor which is taken into account in changing the filtration time, and the apparatus is not operated while predicting the filtration characteristics or the timing of chemical cleaning. The proposed operation method is hence not useful.

PATENT LITERATURE

[Patent Document 1] JP-A-2019-18191
[Patent Document 2] International Publication WO 2009/054506
[Patent Document 3] JP-A-2006-326473

SUMMARY OF THE INVENTION

An object of the present invention is to provide a method of controlling a fresh-water production apparatus for obtaining treated water by treating natural water, such as river water, lake water, or seawater, sewage, wastewater, or industrial wastewater, on the basis of a prediction of filtration characteristics of a filtration membrane, a trouble assessment method for a fresh-water production apparatus, a fresh-water production apparatus, an operation program for a fresh-water production apparatus, a trouble assessment program for a fresh-water production apparatus, and a storage medium.

(1) A method of controlling a fresh-water production apparatus for treating a raw water in stages by N-stage (N is a natural number of 2 or larger) water treatment methods, the method including:
  a filtration-characteristic prediction step for an n-th stage (n is any natural number of 2 to N) water treatment method, in which a filtration characteristic of the n-th stage water treatment method is predicted from a predicted input condition for the n-th stage;
  a filtration-characteristic prediction step for an (n−1)-th stage water treatment method, in which a filtration characteristic of the (n−1)-th stage water treatment method is predicted from a predicted input condition for the (n−1)-th stage;
  a filtration-characteristic deviation assessment step for the n-th stage water treatment method, in which a deviation between a predicted filtration characteristic of the n-th stage water treatment method and the filtration characteristic of the n-th stage water treatment method is assessed;
  a filtration-characteristic deviation assessment step for the (n−1)-th stage water treatment method, in which a deviation between a predicted filtration characteristic of the (n−1)-th stage water treatment method and the filtration characteristic of the (n−1)-th stage water treatment method is assessed;
  a cyclic prediction calculation step for the (n−1)-th stage water treatment method, in which in cases when the deviation has occurred in the filtration-characteristic deviation assessment step for the (n−1)-th stage water treatment method, the predicted input condition for the (n−1)-th stage water treatment method is changed and a prediction calculation is repeated until the deviation between the predicted filtration characteristic of the (n−1)-th stage water treatment method and the filtration characteristic of the (n−1)-th stage water treatment method decreases to or below a specified value;
  a control condition recording step for the (n−1)-th stage water treatment method, in which a control condition for the (n−1)-th stage water treatment method is determined from a final input condition obtained in the cyclic prediction calculation step for the (n−1)-th stage water treatment method and is recorded;
  a cyclic prediction calculation step for the n-th stage water treatment method, in which the predicted input condition for the n-th stage water treatment method is changed on the basis of the control condition for the (n−1)-th stage water treatment method and a prediction calculation is repeated until the deviation between the predicted filtration characteristic of the n-th stage water treatment method and the filtration characteristic of the n-th stage water treatment method decreases to or below a specified value; and
  a control condition recording step for the n-th stage water treatment method, in which a control condition for the n-th stage water treatment method is determined from a final input condition obtained in the cyclic prediction calculation step for the n-th stage water treatment method and is recorded,
  in which the fresh-water production apparatus is controlled on the basis of the control condition recording step for the (n−1)-th stage water treatment method and the control condition recording step for the n-th stage water treatment method.

(2) A method of controlling a fresh-water production apparatus for treating a raw water in stages by N-stage (N is a natural number of 2 or larger) water treatment methods, the method including:
  a filtration-characteristic prediction step for an n-th stage (n is any natural number of 2 to N) water treatment method, in which a filtration characteristic of the n-th stage water treatment method is predicted from a predicted input condition for the n-th stage;
  a filtration-characteristic prediction step for an (n−1)-th stage water treatment method, in which a filtration characteristic of the (n−1)-th stage water treatment method is predicted from a predicted input condition for the (n−1)-th stage;

a filtration-characteristic deviation assessment step for the n-th stage water treatment method, in which a deviation between a predicted filtration characteristic of the n-th stage water treatment method and the filtration characteristic of the n-th stage water treatment method is assessed;

a filtration-characteristic deviation assessment step for the (n−1)-th stage water treatment method, in which a deviation between a predicted filtration characteristic of the (n−1)-th stage water treatment method and the filtration characteristic of the (n−1)-th stage water treatment method is assessed;

a cyclic prediction calculation step for the n-th stage water treatment method, in which in cases when the deviation has occurred in the filtration-characteristic deviation assessment step for the n-th stage water treatment method, the predicted input condition for the n-th stage water treatment method is changed and a prediction calculation is repeated until the deviation between the predicted filtration characteristic of the n-th stage water treatment method and the filtration characteristic of the n-th stage water treatment method decreases to or below a specified value;

a control condition recording step for the n-th stage water treatment method, in which a control condition for the n-th stage water treatment method is determined from a final input condition obtained in the cyclic prediction calculation step for the n-th stage water treatment method and is recorded;

a cyclic prediction calculation step for the (n−1)-th stage water treatment method, in which the predicted input condition for the (n−1)-th stage water treatment method is changed on the basis of the control condition for the n-th stage water treatment method and a prediction calculation is repeated until the deviation between the predicted filtration characteristic of the (n−1)-th stage water treatment method and the filtration characteristic of the (n−1)-th stage water treatment method decreases to or below a specified value; and a control condition recording step for the (n−1)-th stage water treatment method, in which a control condition for the (n−1)-th stage water treatment method is determined from a final input condition obtained in the cyclic prediction calculation step for the (n−1)-th stage water treatment method and is recorded, in which the fresh-water production apparatus is controlled on the basis of the control condition recording step for the (n−1)-th stage water treatment method and the control condition recording step for the n-th stage water treatment method.

(3) The method of controlling a fresh-water production apparatus according to (1) or (2), further including an operation mode selection step for selecting an operation mode, in which the input condition for filtration-characteristic prediction for each of the N-stage water treatment methods are changed on the basis of the operation mode selected in the operation mode selection step.

(4) The method of controlling a fresh-water production apparatus according to any one of (1) to (3), in which in cases when the deviation has occurred simultaneously in the filtration-characteristic deviation assessment step for the (n−1)-th stage water treatment method and the filtration-characteristic deviation assessment step for the n-th stage water treatment method, the calculation of the control condition for the (n−1)-th stage water treatment method is preferential.

(5) The method of controlling a fresh-water production apparatus according to any one of (1) to (4), in which the fresh-water production apparatus has a treatment flow including any of the followings:

some of a treated water obtained by the (n−1)-th stage water treatment method is mixed with a treated water obtained by the n-th stage water treatment method;

some of the treated water obtained by the n-th stage water treatment method is mixed with the raw water or with the treated water obtained by the (n−1)-th stage water treatment method;

some or all of a discharged water from the n-th stage water treatment method is mixed with the raw water or with the treated water obtained by the (n−1)-th stage water treatment method; and some or all of the discharged water from the n-th stage water treatment method is used as a cleaning water for the (n−1)-th stage water treatment method.

(6) The method of controlling a fresh-water production apparatus according to any one of (1) to (5), in which at least any of the N-stage water treatment methods is a membrane separation method and the membrane separation method employs at least one kind of a separation membrane selected from the group consisting of a microfiltration membrane, an ultrafiltration membrane, and a reverse osmosis membrane.

(7) The method of controlling a fresh-water production apparatus according to any one of (1) to (6), in which the filtration characteristic is at least one kind of a parameter selected from the group consisting of differential pressure, pure-water permeability, and salt permeability.

(8) The method of controlling a fresh-water production apparatus according to any one of (1) to (7), in which in cases when the (n−1)-th stage water treatment method is a membrane separation method employing a separation membrane which is a microfiltration membrane or an ultrafiltration membrane, then the control condition for the (n−1)-th stage water treatment method is at least one condition selected from the group consisting of the following A to C, and in cases when the n-th stage water treatment method is a membrane separation method employing a separation membrane which is a reverse osmosis membrane, then the control condition for the n-th stage water treatment method is at least one condition selected from the group consisting of the following F to I:

A. period of a filtration step, filtration rate, circulation rate (in the case of cross flow filtration);

B. period of each physical washing step and CEB step, the number of each step, flow rate in each washing, combination of each step, concentration of injected cleaning chemical, kind of cleaning chemical;

C. concentration of added coagulant;

F. at least any of feed-water flow rate, concentrate flow rate, and permeate flow rate, or recovery;

G. ratio between rates of upstream and downstream permeate discharge (in the case of splitting);

H. concentration of injected feed-water scale inhibitor, bactericide, pH regulator, or reducing agent;

I. flow rate, pressure, period or frequency of physical washing (flushing).

(9) A method of trouble assessment for a fresh-water production apparatus, the method including a trouble assessment step in which in N-stage water treatment methods, a trouble in each of the N-stage water treatment methods is assessed from a final predicted input condition obtained in a cyclic prediction calculation step for each of the N-stage water treatment methods.

(10) The method of trouble assessment for a fresh-water production apparatus according to (9), in which in the cyclic prediction calculation step for each of the N-stage water treatment methods, a predicted input condition for each of the N-stage water treatment methods is changed preferentially using a condition acquired off-line.

(11) The method of trouble assessment for a fresh-water production apparatus according to (10), in which in the cyclic prediction calculation step for each of the N-stage water treatment methods, the predicted input condition for each of the N-stage water treatment method is changed preferentially using a condition acquired off-line with respect to each of steps into which the operation of the fresh-water production apparatus has been divided, the condition having been obtained by analyzing changes in filtration characteristic of the steps.

(12) A fresh-water production method including producing fresh water while at least performing either of the following A and B, on the basis of a result obtained by the method of trouble assessment according to any one of (9) to (11):
  A. to output an alarm for a trouble assessment factor;
  B. to control the trouble assessment factor.

(13) A fresh-water production apparatus for treating a raw water in stages by N-stage (N is a natural number of 2 or larger) water treatment methods, including:
  a filtration-characteristic prediction means for an n-th stage (n is any natural number of 2 to N) water treatment method, in which a filtration characteristic of the n-th stage water treatment method is predicted from a predicted input condition for the n-th stage;
  a filtration-characteristic prediction means for an (n−1)-th stage water treatment method, in which a filtration characteristic of the (n−1)-th stage water treatment method is predicted from a predicted input condition for the (n−1)-th stage;
  a filtration-characteristic deviation assessment means for the n-th stage water treatment method, in which a deviation between a predicted filtration characteristic of the n-th stage water treatment method and the filtration characteristic of the n-th stage water treatment method is assessed;
  a filtration-characteristic deviation assessment means for the (n−1)-th stage water treatment method, in which a deviation between a predicted filtration characteristic of the (n−1)-th stage water treatment method and the filtration characteristic of the (n−1)-th stage water treatment method is assessed;
  a cyclic prediction calculation means for the (n−1)-th stage water treatment method, in which in cases when the deviation has occurred in the filtration-characteristic deviation assessment means for the (n−1)-th stage water treatment method, the predicted input condition for the (n−1)-th stage water treatment method is changed and a prediction calculation is repeated until the deviation between the predicted filtration characteristic of the (n−1)-th stage water treatment method and the filtration characteristic of the (n−1)-th stage water treatment method decreases to or below a specified value;
  a control condition recording means for the (n−1)-th stage water treatment method, in which a control condition for the (n−1)-th stage water treatment method is determined from a final input condition obtained in the cyclic prediction calculation means for the (n−1)-th stage water treatment method and is recorded;
  a cyclic prediction calculation means for the n-th stage water treatment method, in which the predicted input condition for the n-th stage water treatment method is changed on the basis of the control condition for the (n−1)-th stage water treatment method and a prediction calculation is repeated until the deviation between the predicted filtration characteristic of the n-th stage water treatment method and the filtration characteristic of the n-th stage water treatment method decreases to or below a specified value;
  a control condition recording means for the n-th stage water treatment method, in which a control condition for the n-th stage water treatment method is determined from a final input condition obtained in the cyclic prediction calculation means for the n-th stage water treatment method and is recorded; and
  a control means of controlling the fresh-water production apparatus on the basis of the control condition recording means for the (n−1)-th stage water treatment method and the control condition recording means for the n-th stage water treatment method.

(14) A fresh-water production apparatus for treating a raw water in stages by N-stage (N is a natural number of 2 or larger) water treatment methods, including:
  a filtration-characteristic prediction means for an n-th stage (n is any natural number of 2 to N) water treatment method, in which a filtration characteristic of the n-th stage water treatment method is predicted from a predicted input condition for the n-th stage;
  a filtration-characteristic prediction means for an (n−1)-th stage water treatment method, in which a filtration characteristic of the (n−1)-th stage water treatment method is predicted from a predicted input condition for the (n−1)-th stage;
  a filtration-characteristic deviation assessment means for the n-th stage water treatment method, in which a deviation between a predicted filtration characteristic of the n-th stage water treatment method and the filtration characteristic of the n-th stage water treatment method is assessed;
  a filtration-characteristic deviation assessment means for the (n−1)-th stage water treatment method, in which a deviation between a predicted filtration characteristic of the (n−1)-th stage water treatment method and the filtration characteristic of the (n−1)-th stage water treatment method is assessed;
  a cyclic prediction calculation means for the n-th stage water treatment method, in which in cases when the deviation has occurred in the filtration-characteristic deviation assessment means for the n-th stage water treatment method, the predicted input condition for the n-th stage water treatment method is changed and a prediction calculation is repeated until the deviation between the predicted filtration characteristic of the n-th stage water treatment method and the filtration characteristic of the n-th stage water treatment method decreases to or below a specified value;
  a control condition recording means for the n-th stage water treatment method, in which a control condition for the n-th stage water treatment method is determined from a final input condition obtained in the cyclic prediction calculation means for the n-th stage water treatment method and is recorded;
  a cyclic prediction calculation means for the (n−1)-th stage water treatment method, in which the predicted input condition for the (n−1)-th stage water treatment method is changed on the basis of the control condition for the n-th stage water treatment method and a prediction calculation is repeated until the deviation between the predicted filtration characteristic of the (n−1)-th stage water treatment method and the filtration characteristic of the (n−1)-th stage water treatment method decreases to or below a specified value;
a control condition recording means for the (n−1)-th stage water treatment method, in which a control condition for the (n−1)-th stage water treatment method is determined from a final input condition obtained in the cyclic prediction calculation means for the (n−1)-th stage water treatment method and is recorded; and
a control means of controlling the fresh-water production apparatus on the basis of the control condition recording means for the (n−1)-th stage water treatment method and the control condition recording means for the n-th stage water treatment method.

(15) The fresh-water production apparatus according to (13) or (14), including:
an operation mode selection means which selects an operation mode;
a cyclic prediction calculation means for each of the N-stage water treatment methods which changes the input condition for filtration-characteristic prediction for each of the N-stage water treatment methods on the basis of the operation mode selected by the operation mode selection means and repeats a prediction calculation until the derivation between a predicted filtration characteristic of each of the N-stage water treatment methods and a filtration characteristic of each of the N-stage water treatment methods decreases to or below a specified value; and
a control means which controls the fresh-water production apparatus on the basis of a control condition recording means for each of the N-stage water treatment methods which determines a control condition for each of the N-stage water treatment methods from a final input condition obtained by the cyclic prediction calculation means for each of the N-stage water treatment methods and records the control condition.

(16) The fresh-water production apparatus according to any one of (13) to (15), having a treatment flow including any of the followings:
some of a treated water obtained by the (n−1)-th stage water treatment method is mixed with a treated water obtained by the n-th stage water treatment method;
some of the treated water obtained by the n-th stage water treatment method is mixed with the raw water or with the treated water obtained by the (n−1)-th stage water treatment method;
some or all of a discharged water from the n-th stage water treatment method is mixed with the raw water or with the treated water obtained by the (n−1)-th stage water treatment method; and
some or all of the discharged water from the n-th stage water treatment method is used as cleaning water for the (n−1)-th stage water treatment method.

(17) The fresh-water production apparatus according to any one of (13) to (16), in which at least any of the N-stage water treatment methods is a membrane separation method and the membrane separation method employs at least one kind of a separation membrane selected from the group consisting of a microfiltration membrane, an ultrafiltration membrane, and a reverse osmosis membrane.

(18) The fresh-water production apparatus according to any one of (13) to (17), in which in cases when the (n−1)-th stage water treatment method is a membrane separation method employing a separation membrane which is a microfiltration membrane or an ultrafiltration membrane, then the control condition for the (n−1)-th stage water treatment method is at least one condition selected from the group consisting of the following A to C, and in cases when the n-th stage water treatment method is a membrane separation method employing a separation membrane which is a reverse osmosis membrane, then the control condition for the n-th stage water treatment method is at least one condition selected from the group consisting of the following F to I:
  A. period of a filtration step, filtration rate, circulation rate (in the case of cross flow filtration);
  B. period of each physical washing step and CEB step, the number of each step, flow rate in each washing, combination of each step, concentration of injected cleaning chemical, kind of cleaning chemical;
  C. concentration of added coagulant;
  F. at least any of feed-water flow rate, concentrate flow rate, and permeate flow rate, or recovery;
  G. ratio between rates of upstream and downstream permeate discharge (in the case of splitting);
  H. concentration of injected feed-water scale inhibitor, bactericide, pH regulator, or reducing agent;
  I. flow rate, pressure, period or frequency of physical washing (flushing).

(19) The fresh-water production apparatus according to any one of (13) to (18), including a trouble assessment means which assesses a trouble from the final input condition obtained by the cyclic prediction calculation means for each of the N-stage water treatment methods.

(20) A fresh-water production apparatus including an alarm output/control means which outputs an alarm for a trouble factor or controls the trouble factor, on the basis of a result obtained by the trouble assessment means for each of the N-stages according to (19).

(21) An operation program for a fresh-water production apparatus for treating a raw water in stages by N-stage (N is a natural number of 2 or larger) water treatment methods, the operation program causing a computer to execute the following steps in order to operate the fresh-water production apparatus:
a filtration-characteristic prediction step for an n-th stage (n is any natural number of 2 to N) water treatment method, in which a filtration characteristic of the n-th stage water treatment method is predicted from a predicted input condition for the n-th stage;
a filtration-characteristic prediction step for an (n−1)-th stage water treatment method, in which a filtration characteristic of the (n−1)-th stage water treatment method is predicted from a predicted input condition for the (n−1)-th stage;
a filtration-characteristic deviation assessment step for the n-th stage water treatment method, in which a deviation between a predicted filtration characteristic of the n-th stage water treatment method and the filtration characteristic of the n-th stage water treatment method is assessed;
a filtration-characteristic deviation assessment step for the (n−1)-th stage water treatment method, in which a deviation between a predicted filtration characteristic of the (n−1)-th stage water treatment method and the filtration characteristic of the (n−1)-th stage water treatment method is assessed;
a cyclic prediction calculation step for the (n−1)-th stage water treatment method, in which in cases when the deviation has occurred in the filtration-characteristic deviation assessment step for the (n−1)-th stage water treatment method, the predicted input condition for the (n−1)-th stage water treatment method is changed and a prediction calculation is repeated until the deviation between the predicted filtration characteristic of the (n−1)-th stage water treatment method and the filtration characteristic of the (n−1)-th stage water treatment method decreases to or below a specified value;

a control condition recording step for the (n−1)-th stage water treatment method, in which a control condition for the (n−1)-th stage water treatment method is determined from a final input condition obtained in the cyclic prediction calculation step for the (n−1)-th stage water treatment method and is recorded;

a cyclic prediction calculation step for the n-th stage water treatment method, in which the predicted input condition for the n-th stage water treatment method is changed on the basis of the control condition for the (n−1)-th stage water treatment method and a prediction calculation is repeated until the deviation between the predicted filtration characteristic of the n-th stage water treatment method and the filtration characteristic of the n-th stage water treatment method decreases to or below a specified value;

a control condition recording step for the n-th stage water treatment method, in which a control condition for the n-th stage water treatment method is determined from a final input condition obtained in the cyclic prediction calculation step for the n-th stage water treatment method and is recorded; and a control step in which the fresh-water production apparatus is controlled on the basis of the control condition recording step for the (n−1)-th stage water treatment method and the control condition recording step for the n-th stage water treatment method.

(22) An operation program for a fresh-water production apparatus for treating a raw water in stages by N-stage (N is a natural number of 2 or larger) water treatment methods, the operation program causing a computer to execute the following steps in order to operate the fresh-water production apparatus:

a filtration-characteristic prediction step for an n-th stage (n is any natural number of 2 to N) water treatment method, in which a filtration characteristic of the n-th stage water treatment method is predicted from a predicted input condition for the n-th stage;

a filtration-characteristic prediction step for an (n−1)-th stage water treatment method, in which a filtration characteristic of the (n−1)-th stage water treatment method is predicted from a predicted input condition for the (n−1)-th stage;

a filtration-characteristic deviation assessment step for the n-th stage water treatment method, in which a deviation between a predicted filtration characteristic of the n-th stage water treatment method and the filtration characteristic of the n-th stage water treatment method is assessed;

a filtration-characteristic deviation assessment step for the (n−1)-th stage water treatment method, in which a deviation between a predicted filtration characteristic of the (n−1)-th stage water treatment method and the filtration characteristic of the (n−1)-th stage water treatment method is assessed;

a cyclic prediction calculation step for the n-th stage water treatment method, in which in cases when the deviation has occurred in the filtration-characteristic deviation assessment step for the n-th stage water treatment method, the predicted input condition for the n-th stage water treatment method is changed and a prediction calculation is repeated until the deviation between the predicted filtration characteristic of the n-th stage water treatment method and the filtration characteristic of the n-th stage water treatment method decreases to or below a specified value;

a control condition recording step for the n-th stage water treatment method, in which a control condition for the n-th stage water treatment method is determined from a final input condition obtained in the cyclic prediction calculation step for the n-th stage water treatment method and is recorded;

a cyclic prediction calculation step for the (n−1)-th stage water treatment method, in which the predicted input condition for the (n−1)-th stage water treatment method is changed on the basis of the control condition for the n-th stage water treatment method and a prediction calculation is repeated until the deviation between the predicted filtration characteristic of the (n−1)-th stage water treatment method and the filtration characteristic of the (n−1)-th stage water treatment method decreases to or below a specified value;

a control condition recording step for the (n−1)-th stage water treatment method, in which a control condition for the (n−1)-th stage water treatment method is determined from a final input condition obtained in the cyclic prediction calculation step for the (n−1)-th stage water treatment method and is recorded; and a control step in which the fresh-water production apparatus is controlled on the basis of the control condition recording step for the (n−1)-th stage water treatment method and the control condition recording step for the n-th stage water treatment method.

(23) The operation program according to (21) for a fresh-water production apparatus for treating a raw water in stages by N-stage (N is a natural number of 2 or larger) water treatment methods, the operation program for the fresh-water production apparatus having an operation mode selection step for selecting an operation mode, and the operation program causing a computer to execute the following steps in order to operate the fresh-water production apparatus:

a cyclic prediction calculation step for the (n−1)-th stage water treatment method, in which the predicted input condition for the (n−1)-th stage water treatment method is changed on the basis of an operation mode selected in the operation mode selectin step and a prediction calculation is repeated until the deviation between the predicted filtration characteristic of the (n−1)-th stage water treatment method and the filtration characteristic of the (n−1)-th stage water treatment method is eliminated;

a cyclic prediction calculation step for the n-th stage water treatment method, in which the predicted input condition for the n-th stage water treatment method is changed on the basis of the operation mode selected in the operation mode selection step and a prediction calculation is repeated until the deviation between the predicted filtration characteristic of the n-th stage water treatment method and the filtration characteristic of the n-th stage water treatment method is eliminated;

a control condition recording step for the (n−1)-th stage water treatment method, in which a control condition for the (n−1)-th stage water treatment method is determined from a final input condition obtained in at least the cyclic prediction calculation step for the (n−1)-th stage water treatment method, of the cyclic prediction calculation steps respectively for the (n–1)-th stage water treatment method and the n-th stage water treatment method, and is recorded; and a control step in which the fresh-water production apparatus is controlled on the basis of the control condition recording step for the (n–1)-th stage water treatment method.

(24) The operation program according to (22) for a fresh-water production apparatus for treating a raw water in stages by N-stage (N is a natural number of 2 or larger) water treatment methods, the operation program for the fresh-water production apparatus having an operation mode selection step for selecting an operation mode, and the operation program causing a computer to execute the following steps in order to operate the fresh-water production apparatus:

a cyclic prediction calculation step for the (n–1)-th stage water treatment method, in which the predicted input condition for the (n–1)-th stage water treatment method is changed on the basis of an operation mode selected in the operation mode selectin step and a prediction calculation is repeated until the deviation between the predicted filtration characteristic of the (n–1)-th stage water treatment method and the filtration characteristic of the (n–1)-th stage water treatment method is eliminated;

a cyclic prediction calculation step for the n-th stage water treatment method, in which the predicted input condition for the n-th stage water treatment method is changed on the basis of the operation mode selected in the operation mode selection step and a prediction calculation is repeated until the deviation between the predicted filtration characteristic of the n-th stage water treatment method and the filtration characteristic of the n-th stage water treatment method is eliminated;

a control condition recording step for the n-th stage water treatment method, in which a control condition for the n-th stage water treatment method is determined from a final input condition obtained in at least the cyclic prediction calculation step for the n-th stage water treatment method, of the cyclic prediction calculation steps respectively for the (n–1)-th stage water treatment method and the n-th stage water treatment method, and is recorded; and a control step in which the fresh-water production apparatus is controlled on the basis of the control condition recording step for the n-th stage water treatment method.

(25) The operation program according to any one of (21) to (24) for a fresh-water production apparatus for treating a raw water in stages by N-stage (N is a natural number of 2 or larger) water treatment methods, in which in cases when the (n–1)-th stage water treatment method is a membrane separation method employing a separation membrane which is a microfiltration membrane or an ultrafiltration membrane, then the control condition to be recorded in the control condition recording step for the (n–1)-the stage water treatment method is at least one condition selected from the group consisting of the following A to C, and in cases when the n-th stage water treatment method is a membrane separation method employing a separation membrane which is a reverse osmosis membrane, then the control condition to be recorded in the control condition recording step for the n-the stage water treatment method is at least one condition selected from the group consisting of the following F to I, the operation program causing a computer to execute a control step in which the fresh-water production apparatus is controlled on the basis of the control condition recording step for the (n–1)-th stage water treatment method and the control condition recording step for the n-th stage water treatment method:

A. period of a filtration step, filtration rate, circulation rate (in the case of cross flow filtration);

B. period of each physical washing step and CEB step, the number of each step, flow rate in each washing, combination of each step, concentration of injected cleaning chemical, kind of cleaning chemical;

C. concentration of added coagulant;

F. at least any of feed-water flow rate, concentrate flow rate, and permeate flow rate, or recovery;

G. ratio between rates of upstream and downstream permeate discharge (in the case of splitting);

H. concentration of injected feed-water scale inhibitor, bactericide, pH regulator, or reducing agent;

I. flow rate, pressure, period or frequency of physical washing (flushing).

(26) A trouble assessment program for a fresh-water production apparatus for treating a raw water in stages by N-stage (N is a natural number of 2 or larger) water treatment methods, the trouble assessment program causing, in order to operate the fresh-water production apparatus, a computer to execute a trouble assessment step in which a trouble is assessed from a final predicted input condition obtained in a cyclic prediction calculation step for each of the N-stage water treatment methods.

(27) The trouble assessment program for a fresh-water production apparatus according to (26), causing a computer to execute a condition changing step in which a condition acquired off-line is preferentially used for changing the predicted input condition in the cyclic prediction calculation step for each of the N stages.

(28) The trouble assessment program for a fresh-water production apparatus according to (27), causing a computer to execute a filtration-characteristic analysis step in which a change in filtration characteristic is analyzed with respect to each of steps into which the operation of the fresh-water production apparatus has been divided, in order to change the predicted input condition in the cyclic prediction calculation step for each of the N stages.

(29) An operation program for a fresh-water production apparatus, the program causing a computer to execute at least either of the following steps of A and B, in order to operate the fresh-water production apparatus, in accordance with a result obtained by the trouble assessment program according to any one of (26) to (28):

A. an alarm output step in which an alarm for a trouble assessment factor is outputted;

B. a control step in which the trouble assessment factor is controlled.

(30) A storage medium readable with a computer, storing the program according to any one of (21) to (29).

According to the present invention, troubles in a fresh-water production apparatus can be extremely easily grasped and measures against the abnormalities can be taken in an early stage. It is hence possible to stably continue the operation while efficiently taking measures against troubles in the fresh-water production apparatus.

DETAILED DESCRIPTION OF EMBODIMENTS OF THE INVENTION

Figure 1:
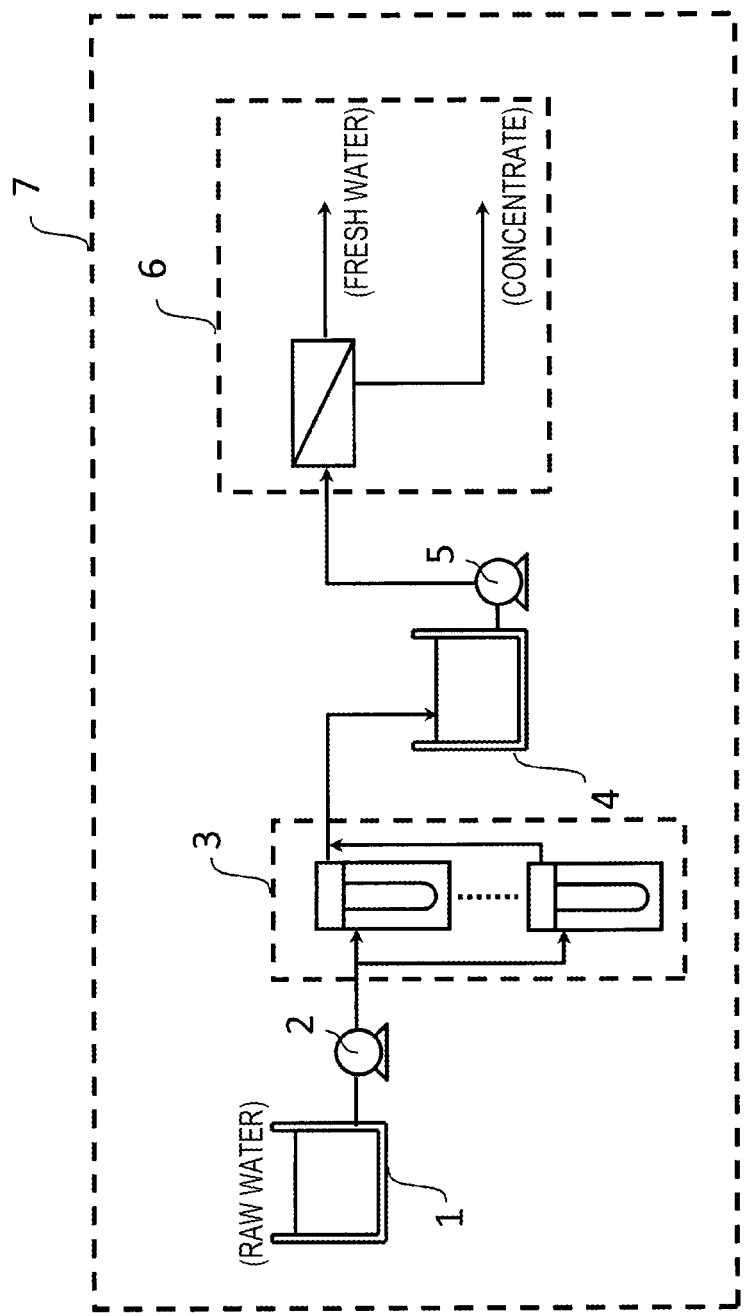
FIG. 1 is a flowchart showing an example of a fresh-water production apparatus of the present invention.

The present invention is explained in detail below on the basis of the embodiments shown in the drawings. In the following explanations, methods in which raw water is treated in stages by two-stage membrane separation methods or water treatment methods. However, the present invention is not limited to the following embodiments.

An example of the fresh-water production apparatuses of the present invention is, as FIG. 1 shows, a fresh-water production apparatus 7 including: a raw-water tank 1 for retaining raw water to be treated, a first separation membrane device 3 which, in the case where the first water treatment method is a membrane separation method, is for treating the raw water with a first separation membrane to produce treated water, a feed pump 2 for feeding the raw water to the first separation membrane device 3, a permeate tank 4 for retaining the permeate obtained through filtration by the first separation membrane device 3, a second separation membrane device 6 which, in the case where the second water treatment method is a membrane separation method, is for further treating the permeate with a second separation membrane, and a high-pressure pump 5 for sending the permeate to the second separation membrane device 6.

The raw water to be treated is a solution to be treated using a water treatment method, and examples thereof include river water, groundwater, seawater, water obtained by sewage treatment, industrial wastewater, and culture broth.

The separation membrane used in the first separation membrane device 3 is not particularly limited in the pore diameter thereof so long as the separation membrane is porous. However, a microfiltration membrane (MF membrane) or an ultrafiltration membrane (UF membrane) is used or both are used in combination, in accordance with desired properties of the raw water and water feed rate. For example, in the case where it is desired to remove suspended components, coli bacteria, Cryptosporidium, etc., either an MF membrane or a UF membrane may be used. However, in the case where it is desired to further remove viruses, high-molecular-weight organic substances, or the like, it is preferred to use a UF membrane. Examples of forms of separation membranes include hollow-fiber membrane, flat membrane, tubular membrane, and monolithic membrane, and any of these may be used. With respect to the material of each separation membrane, it is preferable that the material includes at least one member selected from the group consisting of polyethylene, polypropylene, polyacrylonitrile, ethylene/tetrafluoroethylene copolymers, polychlorotrifluoroethylene, polytetrafluoroethylene, poly(vinyl fluoride), tetrafluoroethylene/hexafluoropropylene copolymers, tetrafluoroethylene/perfluoroalkyl vinyl ether copolymers, chlorotrifluoroethylene/ethylene copolymers, poly(vinylidene fluoride), polysulfones, cellulose acetate, poly(vinyl alcohol), polyethersulfones, and inorganic materials such as ceramics. Poly(vinylidene fluoride) (PVDF) is more preferred from the standpoints of membrane strength and chemical resistance. Polyacrylonitrile is more preferred from the standpoint that this polymer has high hydrophilicity and high nonfouling properties. With respect to membrane filtration mode, either a dead-end filtration type module or a cross flow filtration type may be used, but the dead-end filtration type is preferred because of the small energy consumption thereof. The separation membrane may be either the pressurized type or the immersion type, but the pressurized type is preferred because this type can be operated at a high flow rate. Furthermore, the separation membrane may be either the external-pressure type, in which raw water is fed from the outside of the membrane and a permeate is obtained on the inside thereof, or the internal-pressure type, in which raw water is fed from the inside of the membrane and a permeate is obtained on the outside thereof, but the external-pressure type is preferred from the standpoint of ease of pretreatments.

During filtration in the first separation membrane device 3 including the first separation membrane, raw water to be treated is fed to the upstream side of the first separation membrane device 3 with the feed pump 2 and a permeate is obtained on the downstream side. However, as the filtration proceeds, the filtration resistance of the separation membrane, i.e., the difference in pressure (differential pressure) between the upstream side and the downstream side of the first separation membrane, increases. A general method of suppressing this increase in differential pressure is to operate the separation membrane device while periodically conducting physical washing so that the filtration and the physical washing are repeated.

In a general method of the physical washing, the filtration is temporarily stopped and a backwashing step, an air washing step, a draining step, and a water feed step are conducted in order. However, there are no problems even when the backwashing step and the air washing step are simultaneously conducted or the backwashing step is conducted after the draining step or any of those steps is omitted or conducted in two or more times.

The backwashing step is a step in which a permeate retained in the permeate tank is caused to flow backward by a backwashing pump (not shown) from the downstream side to the upstream side of the first separation membrane in the direction opposite to the filtration direction to wash the first separation membrane. The back washings which have passed to the upstream side are discharged from the system through a back-washings discharge pipeline. After the backwashing is conducted for a given time period, the backwashing pump is stopped to terminate the backwashing step.

The air washing step is a step in which compressed air is supplied with an air washing blower (not shown) to under the first separation membrane to oscillate and thereby wash the separation membrane. After the air washing is conducted for a given time period, the air washing blower is stopped to terminate the air washing. The air supplier may be either a blower or a compressor. In the case of a compressor, however, it is preferable that the compressor is of the oil-free type so that an oil is not supplied to the separation membrane via the air.

The draining step is a step in which the suspended components removed from the first separation membrane in the backwashing step and air washing step are discharged from the system. The suspended components are discharged from the system through a drainage pipeline connected to under the first separation membrane. After the draining is conducted for a given time period, the draining step is terminated.

The water feed step is a step in which after the draining step, raw water to be treated is fed to the upstream side of the first separation membrane. The raw water is fed to the upstream side of the first separation membrane with the feed pump 2, and after the upstream-side space is filled therewith, the excess water overflows and is discharged through a washing pipeline. After the water feeding is conducted for a given time period, the water feed step is terminated.

It is preferred to perform chemical-enhanced backwashing (CEB) after the filtration and the physical washing are repeatedly conducted multiple times. The CEB is conducted by performing backwashing while supplying a chemical to the backwashing water with a pump (not shown) for chemical injection into backwashing water.

Usable as the chemical is an aqueous solution of a chemical agent such as hydrochloric acid, sulfuric acid, nitric acid, citric acid, oxalic acid, ascorbic acid, sodium hydrogen sulfite, sodium hydroxide, or sodium hypochlorite. In particular, oxidizing agents such as sodium hypochlorite are effective in removing organic-containing contaminants present in seawater, river water, water obtained by sewage or wastewater treatment, etc. The concentration of sodium hypochlorite is preferably from 10 mg/L to 10,000 mg/L. This is because concentrations thereof less than 10 mg/L result in an insufficient detergent effect, while concentrations thereof higher than 10,000 mg/L result in an increase in the cost of the chemical agent and are uneconomical. A more preferred range of the concentration from these standpoints is from 100 mg/L to 5,000 mg/L.

To take a certain contact period after the addition of the chemical enhances the detergent effect. The time period during which the membrane is kept in contact with the chemical is preferably about from 5 minutes to 3 hours. This is because too short contact periods result in insufficient detergency, while too long contact periods result in too long device operation suspension periods and a decrease in device operation efficiency and are hence uneconomical.

A microfiltration membrane or ultrafiltration membrane of the pressurized type was illustrated in FIG. 1. In the case of a separation membrane of the immersion type, the separation membrane device may be configured so that, although not shown in the drawing, a pump or the like is disposed on the downstream side of the immersion type separation membrane to suck the raw water in order to filter the raw water with the immersion type separation membrane or so that the liquid level in the permeate tank is lower than the liquid level in the raw-water tank in order to conduct the filtration using a difference in water head pressure as a driving force.

In the case of the immersion type membrane separation, air washing is conducted with air supplied continuously or intermittently from an air blower. From the air blower, air is supplied to the immersion type separation membrane through an air diffusion pipe disposed under the immersed membrane. As a result, flows of either the liquid or a gas/liquid mixture phase occur in parallel with the membrane surface, and the suspended substances adherent to the membrane surface are removed therefrom by the flows. A common operation sequence includes a filtration step and a suspension step, and the device is generally operated while continuously preforming the air washing with the air blower during both steps so that the suspended substances which have accumulated in the filtration step are removed from the membrane surface in the suspension step.

The membrane used in a membrane element constituting the immersion type separation membrane is not particularly limited, and may be either a flat membrane or a hollow-fiber membrane. The structure of the membrane is not particularly limited, and any of the following may, for example, be used: a flat-membrane element structure; a flat-membrane element structure including a flat membrane which has been spirally wound; a flexible flat-membrane element structure that includes a pair of flat membranes disposed so that the permeate-side surfaces thereof face each other and having a water collection channel disposed therebetween and further includes a sealing part which seals peripheral portions of the flat membranes; and a hollow-fiber membrane element structure including a bundle of a plurality of hollow-fiber membranes.

Examples of the second separation membrane to which the present invention is applied include a reverse osmosis membrane (not shown). In this embodiment, the pressure of the raw water to be treated is elevated by a high-pressure pump for feeding the raw water to the reverse osmosis membrane, and the pressurized raw water is separated by the reverse osmosis membrane into a permeate and a concentrate. Disposed on the discharge side of the high-pressure pump is either a feed flow rate control valve, which is for controlling the feed flow rate of the raw water discharged from the high-pressure pump and to be fed to the reverse osmosis membrane, or an inverter, which controls the frequency of the high-pressure pump to control the feed flow rate of the raw water being discharged from the high-pressure pump. On the concentrate side also, a concentrate flow rate control valve for controlling the concentrate flow rate is disposed. Thus, the second separation membrane device is generally operated while controlling the flow rates of the feed water and concentrate.

There are cases where a chemical such as a scale inhibitor or a bactericide is injected into the raw water in order to prevent foulant accumulation or where a flushing step is performed in which the operation is temporarily stopped to discharge suspended substances which have accumulated on the upstream side.

The reverse osmosis membrane is disposed in the device after having been processed into a reverse osmosis membrane element. Examples thereof include: a spiral element obtained by winding a flat membrane around a water collection tube; a plate-and-frame element obtained by bonding flat membranes to both surfaces of a supporting plate and stacking such structures at regular intervals with spacers disposed therebetween to constitute a module; a tubular element employing a tubular membrane; and a hollow-fiber membrane element obtained by bundling hollow-fiber membranes and disposing the bundle in a case. Although any of these element forms may be employed, it is preferred to use the spiral element from the standpoints of operation efficiency and interchangeability. The number of elements can be set at will in accordance with the membrane performance. With respect to the material of the membrane, use can be made, for example, of polyamide resins, polypiperazinamide resins, polyester-amide resins, resins obtained by crosslinking water-soluble vinyl polymers, or the like. With respect to membrane structure, use can be made, for example, of: a membrane (asymmetric membrane) which includes a dense layer in at least one surface thereof and which has pores so that the pore diameter increases gradually from the dense layer toward an inner portion of the membrane or toward the other membrane surface; or a membrane (composite membrane) including such an asymmetric membrane and, formed on the dense layer thereof, a very thin separation functional layer constituted of another material. However, composite membranes are preferred from the standpoint of attaining a high fresh-water production rate. Of these, polyamide-based composite membranes, in particular piperazine-polyamide-based composite membranes, are preferred from the standpoints of permeate flow rate, chemical resistance, etc.

With respect to FIG. 1, a fresh-water production apparatus was described above in which the first separation membrane was a microfiltration membrane or an ultrafiltration membrane and the second separation membrane was a reverse osmosis membrane. However, the fresh-water production apparatus may be configured so that the first separation membrane is a microfiltration membrane and the second separation membrane is an ultrafiltration membrane or that the first separation membrane is a reverse osmosis membrane capable of accommodating high salt concentrations and the second separation membrane is a reverse osmosis membrane capable of accommodating low salt concentrations. Besides being configured so as to include membrane separation methods only, the fresh-water production apparatus may employ any of settling/floatation separation, an anaerobic treatment method, a sand filtration method, an ion exchange method, a physical adsorption method, and an oxidation/disinfection method in combination with the first water treatment method and second water treatment method or may include any of those water treatment methods arranged in two or more stages. Specifically, use may be made of a fresh-water production apparatus in which the first water treatment method is a sand filtration method and the second water treatment method is a membrane separation method employing a microfiltration membrane, a fresh-water production apparatus in which the first water treatment method is a membrane separation method employing a reverse osmosis membrane and the second water treatment method is an ion exchange method.

Even in cases when such a fresh-water production apparatus is operated while the pressurized type separation membrane shown in FIG. 1, which is a microfiltration membrane or an ultrafiltration membrane, is being subjected to physical washing or CEB and while the reverse osmosis membrane is being subjected to cleaning by injection of a chemical, such as a scale inhibitor or a bactericide, or to a flushing step, in which the operation is temporarily stopped and the suspended matter accumulated on the upstream side is discharged, then membrane fouling may cause a deterioration in filtration characteristics. In such case, it is necessary to suspend the operation and perform chemical cleaning in which the separation membrane is cleaned with a high-concentration chemical for a long immersion period. If this chemical cleaning is conducted too frequently, not only the suspensions of operation result in a decrease in water production amount but also problems arise, such as the deterioration of the separation membrane due to the chemical and a cost increase due to the chemical cleaning. There are hence cases where a fresh-water production apparatus is operated while predicting an increase in filtration characteristics, as described in Patent Document 1 and Patent Document 2.

However, even in cases when an actual differential pressure has deviated from a predicted value because of any influence, the only measure which has been taken is to output an alarm for the deviation from the predicted value or to newly conduct a prediction calculation for the device in that state to predict an increase in differential pressure for the device in that state. Thus, no measure has been taken with respect to, for example, what the trouble factor is or how the trouble can be diminished. In addition, in the case of a fresh-water production apparatus employing a combination of separation membranes, it is necessary to take account of the filtration characteristics of each separation membrane in controlling the operation, but there has been no effective technique.

Figure 2:
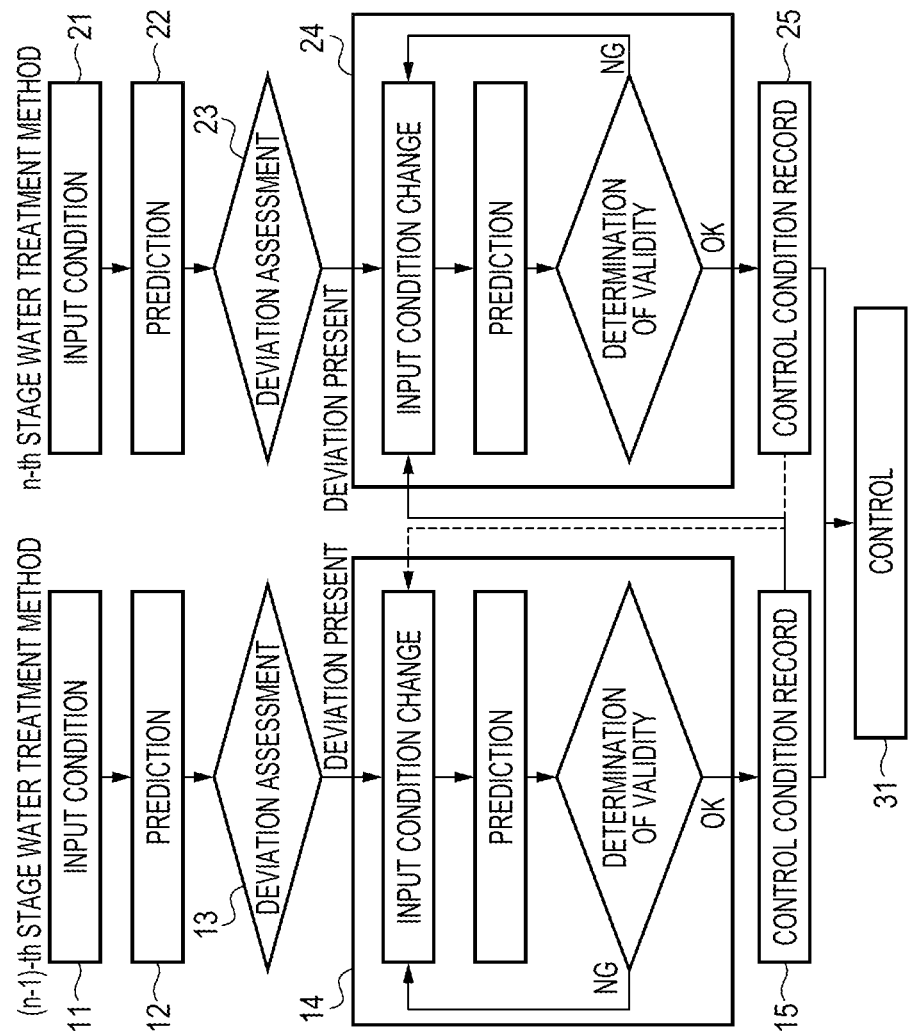
FIG. 2 is a schematic view showing an embodiment of the present invention.

The present invention hence relates to a method of controlling a fresh-water production apparatus on the basis of a prediction of filtration characteristics, and this method is characterized by including the following steps, which are shown in FIG. 2.

This method is for controlling a fresh-water production apparatus, such as that shown in FIG. 1, in which raw water to be treated is treated by an (n−1)-th stage water treatment method and the treated water obtained by the (n−1)-th stage water treatment method is further treated by an n-th stage water treatment method, and is a fresh-water production method characterized by including a filtration-characteristic prediction step 12 for the (n−1)-th stage water treatment method, in which filtration characteristic of the (n−1)-th stage water treatment method is predicted from predicted input condition 11 for the (n−1)-th stage water treatment method, a filtration-characteristic prediction step 22 for the n-th stage water treatment method, in which filtration characteristic of the n-th stage water treatment method is predicted from predicted input condition 21 for the n-th stage water treatment method, a filtration-characteristic deviation assessment step 13 for the (n−1)-th stage water treatment method, in which a deviation between the predicted filtration characteristic of the (n−1)-th stage water treatment method and filtration characteristic of the (n−1)-th stage water treatment method is assessed, a cyclic prediction calculation step 14 for the (n−1)-th stage water treatment method, in which in cases when a deviation from the filtration characteristic of the (n−1)-th stage water treatment method has occurred, the predicted input condition for the (n−1)-th stage water treatment method is changed and a prediction calculation is repeated until the deviation between the predicted filtration characteristic of the (n−1)-th stage water treatment method and filtration characteristic of the (n−1)-th stage water treatment method decreases to or below a specified value, a control condition recording step 15 for the (n−1)-th stage water treatment method, in which control condition for the (n−1)-th stage water treatment method is determined from final input condition obtained in the cyclic prediction calculation step for the (n−1)-th stage water treatment method and is recorded, a cyclic prediction calculation step 24 for the n-th stage water treatment method, in which the predicted input condition for the n-th stage water treatment method is changed on the basis of the control condition for the (n−1)-th stage water treatment method and a prediction calculation is repeated until the deviation between the predicted filtration characteristic of the n-th stage water treatment method and filtration characteristic of the n-th stage water treatment method decreases to or below a specified value, and a control condition recording step 25 for the n-th stage water treatment method, in which control condition for the n-th stage water treatment method is determined from final input condition obtained in the cyclic prediction calculation step for the n-th stage water treatment method and is recorded, in which the fresh-water production apparatus is controlled on the basis of the control condition recording step 15 for the (n−1)-th stage water treatment method and the control condition recording step 25 for the n-th stage water treatment method.

The method described above is for the case where a deviation has occurred in the (n−1)-th stage water treatment method with respect to the filtration-characteristic deviation assessment step for the (n−1)-th stage water treatment method and the filtration characteristic of the (n−1)-th stage water treatment method. It is, however, preferable that the fresh-water production method includes a filtration-characteristic prediction step 22 for the n-th stage water treatment method, a filtration-characteristic deviation assessment step 23 for the n-th stage water treatment method, in which a deviation of filtration characteristic of the n-th stage water treatment method is assessed, a cyclic prediction calculation step 24 for the n-th stage water treatment method, in which in cases when a deviation of the filtration characteristic of the n-th stage water treatment method has occurred, the predicted input condition 21 for the n-th stage water treatment method is changed and a prediction calculation is repeated until the deviation between the predicted filtration characteristic of the n-th stage water treatment method and filtration characteristic of the n-th stage water treatment method decreases to or below a specified value, a control condition recording step 25 for the n-th stage water treatment method, in which control condition for the n-th stage water treatment method is determined from final input condition obtained in the cyclic prediction calculation step 24 for the n-th stage water treatment method and is recorded, a cyclic prediction calculation step 14 for the (n−1)-th stage water treatment method, in which the predicted input condition 11 for the (n−1)-th stage water treatment method is changed on the basis of the control condition 25 for the n-th stage water treatment method and a prediction calculation is repeated until the deviation between the predicted filtration characteristic of the (n−1)-th stage water treatment method and filtration characteristic of the (n−1)-th stage water treatment method decreases to or below a specified value, and a control condition recording step 15 for the (n−1)-th stage water treatment method, in which control condition for the (n−1)-th stage water treatment method is determined from final input condition obtained in the cyclic prediction calculation step for the (n−1)-th stage water treatment method and is recorded, in which the fresh-water production apparatus is controlled on the basis of the control condition recording step 15 for the (n−1)-th stage water treatment method and the control condition recording step 25 for the n-th stage water treatment method.

The predicted input condition 11 for the (n−1)-th stage water treatment method and the predicted input condition 21 for the n-th stage water treatment method are not limited. However, in the case where the (n−1)-th stage water treatment method and the n-th stage water treatment method are membrane separation methods, examples thereof include filtration-step period and filtration rate in the fresh-water production apparatus as shown in Table 1. In the case of a pressurized type separation membrane, the examples include the period of each physical washing step and flow rate in each step, combination of steps for physical washing, the period of each CEB step and flow rate in each step, and combination of steps in CEB step. In the case of an immersion type separation membrane, the examples include the period of each filtration or suspension step and flow rate in an air washing step. In the case of a reverse osmosis membrane, the examples include methods for injecting a chemical, e.g., a scale inhibitor or a bactericide, such as the concentration of the injected chemical and the period of injection, and intervals for a flushing step and the period and strength thereof.

TABLE 1

| Items | On-line | Off-line | Remarks |
|---|---|---|---|
| 1. In the case where the separation membrane is microfiltration membrane or ultrafiltration membrane | | | |
| 1.1 Input condition change items for the case where filtration-characteristics deviation has occurred in filtration step | | | |
| Quality and temperature of raw water | Δ | Δ | Depends on equipment with on-line meter. |
| Index of raw-water property regarding filtration step | x | ○ | |
| Period of filtration step and flow rate therein | ○ | x | Period is acquirable on-line as control conditions and filtration rate is also generally acquirable on-line. |
| Circulation rate (in the case of cross flow filtration) | Δ | Δ | Depends on equipment with on-line meter. |
| 1.2 Input condition change items for the case where filtration-characteristics deviation has occurred in physical washing step | | | |
| Index of raw-water property regarding physical washing step | x | ○ | |
| Period of each physical washing step and flow rate in each step | Δ | Δ | Period is acquirable on-line as control conditions but flow rate depends on equipment with on-line meter. |
| 1.3 Input condition change items for the case where filtration-characteristics deviation has occurred in CEB step | | | |
| Index of raw-water property regarding CEB step | x | ○ | |
| Period of each CEB step and flow rate in each step | Δ | Δ | Period is acquirable on-line as control conditions but flow rate depends on equipment with on-line meter. |
| 2. In the case where the separation membrane is reverse osmosis membrane | | | |
| 2.1 Input condition change items for the case where filtration-characteristics deviation has occurred in filtration step | | | |
| Quality and temperature of separation-membrane permeate | Δ | Δ | Depends on equipment with on-line meter. |
| Index of property of separation-membrane permeate regarding filtration step | x | ○ | |

TABLE 1-continued

| Items | On-line | Off-line | Remarks |
|---|---|---|---|
| Any of feed-water flow rate, concentrate flow rate, and permeate flow rate, and/or recovery | ○ | x | Recovery is acquirable on-line as control conditions and filtration rate also is generally acquirable on-line. |
| Rates of upstream and downstream permeate discharge (in the case of splitting) | Δ | Δ | Depends on equipment with on-line meter. |
| Concentration of injected scale inhibitor, bactericide, pH regulator, or reducing agent in feed water | x | ○ | Mostly equipped with no flow meter with rare exceptions. |
| 2.2 Input condition change items for the case where filtration-characteristics deviation has occurred in physical washing (flushing) step | | | |
| Flow rate and pressure in physical washing (flushing) and period and frequency thereof | Δ | Δ | Period and frequency are acquirable on-line as control conditions but flow rate and pressure depend on equipment with on-line meters. |

\* Note
○: choice
Δ: optional choice
x: non-choice

Although there is a possibility that operation data which can be acquired on-line might be inaccurate due to a sensor failure, etc., it is less probable that a sensor failure occurs. Hence, in cases when input conditions not acquirable on-line are preferentially used to make a prediction by a cyclic calculation in changing predicted input conditions, the accuracy of trouble assessment can be improved. Specifically, it is preferred to discriminate between on-line data and off-line data as shown in Table 1.

For example, in the case shown in FIG. 1, in which the (n−1)-th stage water treatment method is a membrane separation method and the separation membrane is a pressurized type separation membrane, examples of the flow rate in each step of physical washing shown in section 1.2 in Table 1 include backwashing flow rate and air-washing flow rate. However, there are cases where no on-line meter has been disposed therefor, making it impossible to acquire operation data on-line. Because of this, if either of these flow rates is low for some reason, a deterioration in filtration characteristics occurs and a deviation from predicted filtration characteristics occurs. Hence, reliable control conditions can be calculated by conducting a cyclic prediction calculation while preferentially changing predicted input conditions which are being unable to be acquired on-line rather than predicted input conditions which are being acquired on-line.

From these predicted input conditions, filtration characteristics are predicted in the filtration-characteristic prediction step 12 for the (n−1)-th stage water treatment method and the filtration-characteristic prediction step 22 for the n-th stage water treatment method. It is also possible, for example, to draw an approximate line from changes in filtration characteristics over time to predict filtration characteristics. However, in the case where the separation membrane is a microfiltration membrane or an ultrafiltration membrane, use may be made of a method in which the rate of filtration resistance increases during a filtration step or the rate of irreversible filtration resistance remaining unremoved by physical washing is used as a parameter to predict filtration characteristics while taking account of predicted input conditions also. In the case where the separation membrane is a reverse osmosis membrane, filtration characteristics may be predicted from day-average filtration characteristics.

In the filtration-characteristic deviation assessment step 13 for the (n−1)-th stage water treatment method and the filtration-characteristic deviation assessment step 23 for the n-th stage water treatment method, use may be made of a method in which a specified value is set and in cases when the difference has increased to or above the specified value, it is deemed that a deviation has occurred, or a method in which moving averages of changes over time or a rate of change with the lapse of time is examined to assess a deviation.

Furthermore, use may be made of a method in which: the cyclic prediction calculation step 14 for the (n−1)-th stage water treatment method and/or the cyclic prediction calculation step 24 for the n-th stage water treatment method is conducted multiple times; a cyclic calculation is made to calculate multiple sets of predicted input conditions under which a deviation of the filtration characteristics is not larger than a specified value; and those sets of predicted input conditions are recorded as control elements in the control condition recording step 15 for the (n−1)-th stage water treatment method and/or the control condition recording step 25 for the n-th stage water treatment method. It is more preferable that these control elements are arranged in the order of preference by reference to a control history and are controlled in the descending order of possible effectiveness.

It is, however, noted that the predicted input conditions shown above include uncontrollable items. For example, the quality of the raw water to be treated cannot be controlled, and even with any water quality, it is necessary to calculate a factor for control so that no deviation from an initial predicted value occurs. Controllable factors are shown in Table 2 with respect to the case where the water treatment methods are membrane separation methods, as an example. It is necessary to employ different control conditions, among those, in accordance with the kind of the membrane to be used as the separation membrane. For example, it is preferable that in cases when the separation membrane employed in the (n−1)-th stage water treatment method is a microfiltration membrane or an ultrafiltration membrane, then the control conditions for the (n−1)-th stage water treatment method are at least any of the following A to C, and when the separation membrane employed in the n-th stage water treatment method is a reverse osmosis membrane, then the control conditions for the n-th stage water treatment method are at least any of the following F to I:

A. period of a filtration step, filtration rate, circulation rate (in the case of cross flow filtration);

B. period of each physical washing step and CEB step, the number of each step, flow rate in each washing, combination of each step, concentration of injected cleaning chemical, kind of cleaning chemical;
C. concentration of added coagulant;
F. at least any of feed-water flow rate, concentrate flow rate, and permeate flow rate, or recovery;
G. ratio between rates of upstream and downstream permeate discharge (in the case of splitting);
H. concentration of injected feed-water scale inhibitor, bactericide, pH regulator, or reducing agent;
I. flow rate, pressure, period and frequency of physical washing (flushing).

(feed-water side) and after (concentrate side) the pressure vessel and the amounts of the permeate thus discharged before and after the pressure vessel are controlled to keep the overall salt concentration of the permeate constant. It is preferable that the amounts of the permeate thus discharged before and after the pressure vessel are controlled so that there is no deviation from an initial predicted value.

Figure 3:
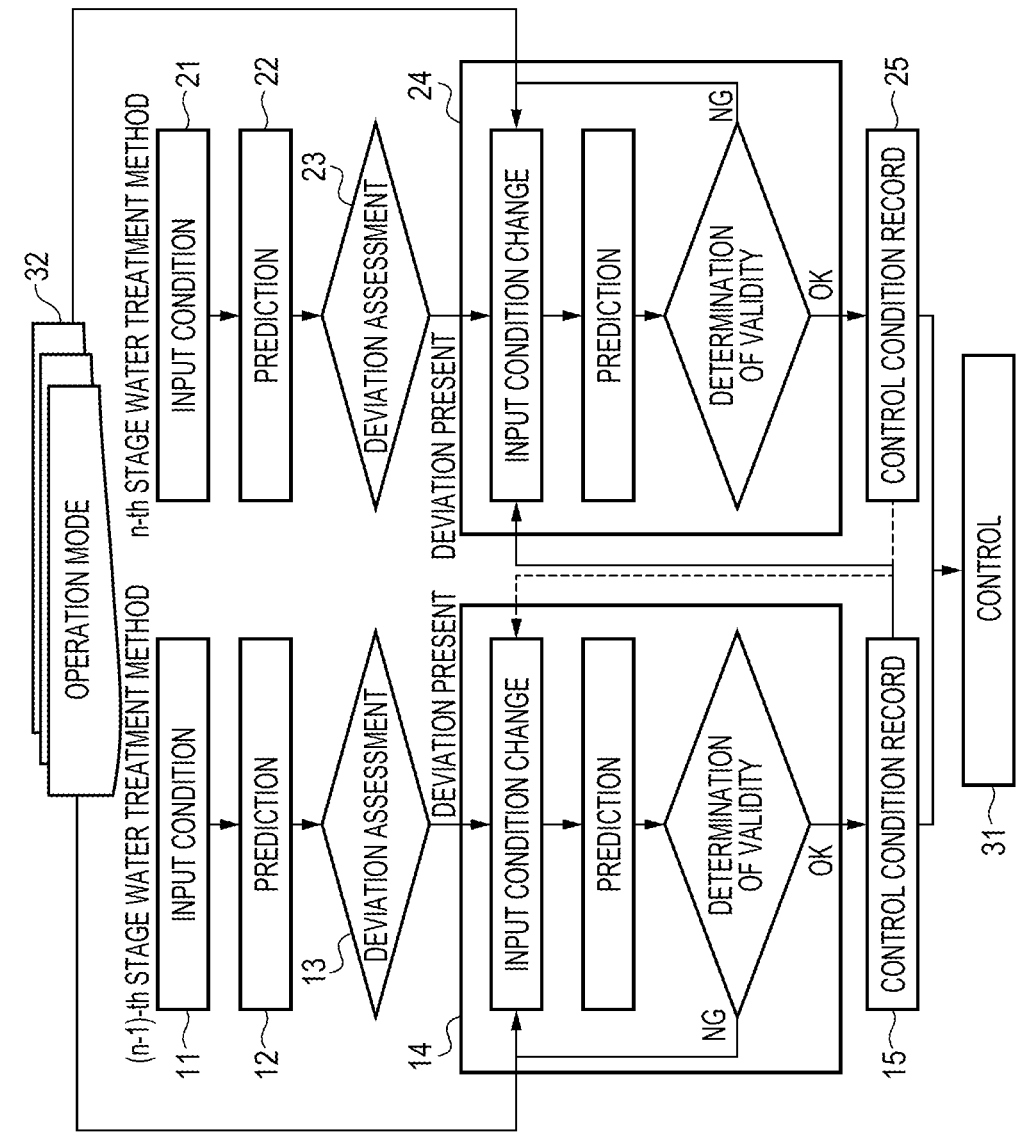
FIG. 3 is a schematic view showing another embodiment of the present invention.

The present invention preferably includes an operation mode as shown in FIG. 3. The operation mode, although not limited, is preferably any of "preference for product-water amount", "preference for product-water quality", "preference for electric-power cost", and "preference for chemical cost". In the case where the water treatment method is a

TABLE 2

| | Operation modes | | | | | | |
|---|---|---|---|---|---|---|---|
| Control items | Preference for product-water amount | Preference for product-water quality | Preference for electric-power cost | Preference for chemical cost | Preference for maintaining intervals for separation membrane washing | Preference for maintaining intervals for separation membrane replacement | Remarks |
| 1. In the case where the separation membrane is microfiltration membrane or ultrafiltration membrane | | | | | | | |
| Period of filtration step and flow rate therein | ○ | ○ | ○ | ○ | ○ | ○ | |
| Circulation rate (in the case of cross flow filtration) | ○ | ○ | ○ | ○ | ○ | x | Cross-flow circulation rate is controlled in the case of cross flow filtration. |
| Period of each physical washing step/CEB step, the number of steps, flow rate in each washing, combination of each step, concentration of injected cleaning chemical | ○ | x | ○ | Δ | ○ | ○ | |
| 2. In the case where the separation membrane is reverse osmosis membrane | | | | | | | |
| At least any of feed-water flow rate, concentrate flow rate, and permeate flow rate, or recovery | ○ | ○ | ○ | ○ | ○ | ○ | |
| Rates of upstream and downstream permeate discharge (in the case of splitting) | x | ○ | x | x | ○ | ○ | |
| Concentration of injected scale inhibitor, bactericide, pH regulator, or reducing agent in feed water | x | ○ | x | ○ | ○ | ○ | |
| Flow rate and pressure in physical washing (flushing) and period and frequency thereof | ○ | ○ | ○ | x | ○ | ○ | |

* Note
○: choice
Δ: optional choice
x: non-choice

With respect to the "G. ratio between rates of upstream and downstream permeate discharge (in the case of splitting)", a general method in the case of a reverse osmosis membrane is to fabricate a module of the reverse osmosis membrane, charge a plurality of such modules into a pressure vessel, and operate the device. In this case, since a permeate flows out in order from the reverse osmosis membrane module nearest to the feed-water side, any succeeding reverse osmosis membrane module is higher in the salt concentration of the raw water than the preceding reverse osmosis membrane module and is higher also in the salt concentration of the permeate accordingly. There are hence cases where the permeate is discharged both before membrane separation method, it is preferred to select an operation mode which is either "preference for maintaining intervals for chemical cleaning of separation membrane" or "preference for maintaining intervals for separation membrane replacement". It is effective that the fresh-water production apparatus has an operation mode selection step 32 in which any of those operation modes can be selected and one or more control items are controlled for each selected operation mode as shown in Table 2. In addition, it is more preferable that control ranges of the control items are set beforehand for each operation mode.

In the present invention, in cases when a deviation has occurred in both the deviation assessment step for the (n−1)-th stage water treatment method and the deviation assessment step for the n-th stage water treatment method, it is preferable that a calculation of control condition for the (n−1)-th stage water treatment method is preferential. This is because in a fresh-water production apparatus in which the (n−1)-th stage water treatment method and the n-th stage water treatment method are both membrane separation methods and the separation membranes have been connected serially, it is highly probable that a trouble in the separation membrane of the (n−1)-th stage water treatment method, which is a pretreatment, leads to the occurrence of a trouble in the separation membrane of the n-th stage water treatment method and because the operation of the whole fresh-water production apparatus can be improved by preferentially taking a measure against the trouble in the separation membrane of the (n−1)-th stage water treatment method.

In the present invention, it is preferable that the filtration characteristic is at least any of differential pressure, pure-water permeability, and salt permeability. Especially in the case of a water treatment method which is a membrane separation method and the separation membrane is a reverse osmosis membrane, it is important to operate the device while watching changes with time of not only differential pressure but also pure-water permeability and salt permeability as filtration characteristics. It is more preferred to assess a trouble on the basis of a combination of those changes over time and to perform control on the basis of the results.

Moreover, in cases when a deviation has occurred in the filtration-characteristic deviation assessment step 13 for the (n−1)-th stage water treatment method and/or the filtration-characteristic deviation assessment step 23 for the n-th stage water treatment method because, for example, the raw water being treated has come to have improved properties and the filtration characteristics in the actual operation have become better than predicted filtration characteristics, then the factors to be calculated in the fresh-water production method may be a prolongation of filtration period or a reduction of the period of physical washing and CEB in the case where the (n−1)-th stage water treatment method is, for example, a membrane separation method and the separation membrane is a microfiltration membrane or an ultrafiltration membrane. Controlling these factors in accordance with the present invention makes it possible to increase the amount of product water and reduce the power cost and chemical cost necessary for physical washing and CEB.

In addition, in cases when the cyclic prediction calculation step, which, when a deviation has occurred in the filtration-characteristic deviation assessment step for any of the N stages, changes predicted input condition and repeats a prediction calculation until the predicted filtration characteristic come to have no deviation from the filtration characteristic of the fresh-water production apparatus, is caused to function, then this cyclic prediction calculation step gives final input conditions including an item which is a trouble factor, thereby making it possible to assess a trouble by the present invention.

Use may be made of a method in which: the filtration-characteristic deviation assessment step is conducted multiple times; a cyclic calculation is made to calculate multiple sets of predicted input conditions at which a deviation of the filtration characteristic is not higher than a specified value; and those sets of predicted input conditions are deemed to be trouble factors. It is more preferable that these trouble factors are arranged in the order of preference by reference to a trouble history and are deemed to be a trouble in the descending order of possible trouble.

Although there is a possibility that operation data which can be acquired on-line might be inaccurate due to a sensor failure, etc., it is less probable that a sensor failure occurs. Hence, predicted input condition which cannot be acquired on-line and is acquired off-line is preferentially used to make a prediction by a cyclic calculation in changing predicted input condition. Thus, the accuracy of trouble assessment can be improved.

For example, in the case of a water treatment method of the fresh-water production apparatus employing a pressurized type separation membrane, examples of the flow rate in each step of physical washing shown in section 1.2 in Table 1 include backwashing flow rate and air-washing flow rate. However, there are cases where no on-line meter has been disposed therefor, making it impossible to acquire operation data on-line. Because of this, if either of these flow rates is low for some reason, a deterioration in filtration characteristics occurs and a deviation from predicted filtration characteristics occurs. Hence, the accuracy of trouble assessment can be improved by conducting trouble assessment while preferentially changing predicted input condition which is being unable to be acquired on-line and is acquired off-line rather than predicted input condition which is being acquired on-line.

A trouble factor which has been extracted by trouble assessment may be regarded as an abnormality to output an alarm. It is preferable that alarms for abnormalities can be outputted in stages, and the alarms may be given by utilizing a noticing means, e.g., mails. Furthermore, by controlling items extracted by trouble assessment, the fresh-water production apparatus can be stably operated.

Here, a specific example of this embodiment is described below with respect to the case where the (n−1)-th stage water treatment method is a membrane separation method in which the separation membrane is an ultrafiltration membrane and the n-th stage water treatment method is a membrane separation method in which the separation membrane is a reverse osmosis membrane. In cases when it is assumed that the filtration characteristics in an actual operation have deteriorated and a deviation has occurred in the filtration-characteristic deviation assessment step 13 for the (n−1)-th stage water treatment method and that changing the period of each step of physical washing has been selected from among the control items shown in Table 1, then the period of each condition of physical washing among input condition 11 for the (n−1)-th stage water treatment method is prolonged and in the cyclic prediction calculation step 14 for the (n−1)-th stage water treatment method, the cyclic calculation is terminated at the time when the deviation from initial predicted filtration characteristic has been eliminated, the control condition is stored in the control condition recording step 15 for the (n−1)-th stage water treatment method. That the period of each step of physical washing is prolonged means that the proportion of filtration steps decreases, in the device including an ultrafiltration membrane, which is operated while repeating a filtration step and a physical washing step. That is, the amount of water filtered with the separation membrane in the (n−1)-th stage water treatment method decreases. Furthermore, in cases when the preference for product-water amount given in Table 2 has been selected in the operation mode selection step 32 and when the device for the n-th stage water treatment method is assumed to be one in which the separation membrane is not subjected to physical washing, then it is necessary, for the preference for product-water amount, that the permeate flow rate should be kept at a specified value although this reduces the flow rate of water being fed to the separation membrane of the n-th stage water treatment method (permeate from the separation membrane of the (n−1)-th stage water treatment method). That is, the recovery through the separation membrane of the n-th stage water treatment method is increased. With respect to this increase in recovery, predicted input condition for the separation membrane of the n-th stage water treatment method is changed and whether a change in the recovery results in a deviation from initial predicted filtration characteristic or not is assessed in the cyclic prediction calculation step 24 for the n-th stage water treatment method. In cases when there is no deviation, the cyclic calculation is terminated and the control condition is stored in the control condition recording step 25 for the n-th stage water treatment method. Thus, control conditions for both the separation membrane of the (n−1)-th stage water treatment method and the separation membrane of the n-th stage water treatment method in the fresh-water production apparatus 7 are determined and the fresh-water production apparatus is controlled on the basis of the control conditions. Consequently, even if a trouble has arisen in the separation membrane of the (n−1)-th stage water treatment method, both the separation membrane of the (n−1)-th stage water treatment method and the separation membrane of the n-th stage water treatment method can be stably operated while attaining the preference for product-water amount selected in the operation mode selection step 32.

Meanwhile, in cases when it is assumed that an actual operation with the reverse osmosis membrane which is the separation membrane of the n-th stage water treatment method has resulted in a deterioration in differential pressure and/or salt permeability and a deviation has occurred in the filtration-characteristic deviation assessment step 23 for the n-th stage water treatment method and that increasing the concentration of scale inhibitor or bactericide injected into feed water has been selected from among the control items shown in Table 1, then the concentration of a scale inhibitor or bactericide injected into the feed water, among input condition 21 for the n-th stage water treatment method, is increased and in the cyclic prediction calculation step 24 for the n-th stage water treatment method, the cyclic calculation is terminated at the time when the deviation from initial predicted filtration characteristic has been eliminated, the control condition is stored in the control condition recording step 25 for the n-th stage water treatment method. That the concentration of the injected chemical is increased means an increase in the cost of the chemical used for the reverse osmosis membrane of the n-th stage water treatment method. Furthermore, in cases when the preference for chemical cost given in Table 2 has been selected in the operation mode selection step 32, it is necessary, for compensating for the increase in chemical cost for the separation membrane of the n-th stage water treatment method, to reduce the concentration of a chemical to be injected in CEB steps or physical washing steps for the separation membrane of the (n−1)-th stage water treatment method. With respect to this reduction in the concentration of an injected chemical, predicted input condition for the separation membrane of the (n−1)-th stage water treatment method is changed and whether a reduction in the chemical concentration results in a deviation from initial predicted filtration characteristic or not is assessed in the cyclic prediction calculation step 14 for the (n−1)-th stage water treatment method. In cases when there is no deviation, the cyclic calculation is terminated and the control condition is stored in the control condition recording step 15 for the (n−1)-th stage water treatment method. Thus, control conditions for both the separation membrane of the (n−1)-th stage water treatment method and the separation membrane of the n-th stage water treatment method in the fresh-water production apparatus 7 are determined and the fresh-water production apparatus is controlled on the basis of the control conditions. Consequently, even if a trouble has arisen in the separation membrane of the n-th stage water treatment method, both the separation membrane of the (n−1)-th stage water treatment method and the separation membrane of the n-th stage water treatment method can be stably operated while attaining the preference for chemical cost selected in the operation mode selection step 32.

With respect to each of those changes in predicted condition, influences of the change in predicted condition may be determined with an empirical formula or from actual results. It is more preferable that influences of changes in predicted input condition in the fresh-water production apparatus to which the present invention is applied are recorded beforehand and input condition is changed by reference to the record.

Although the explanations given above were on the case where preference for product-water amount or preference for chemical cost had been selected in the operation mode selection step, in cases when another mode has been selected, the control condition shown in Table 2 is preferably changed.

Although not all of the embodiments are described, several examples for water treatment methods which are membrane treatment methods are as follows. In the case where preference for product-water quality has been selected, the filtration-step period and flow rate for the separation membrane of the (n−1)-th stage water treatment method are controlled and the circulation rate, in the case of a cross flow operation, is controlled, thereby improving the quality of the water to be fed to the n-th stage separation membrane, and the quality of the water produced with the separation membrane of the n-th stage water treatment method (permeate quality) is also improved accordingly. With respect to the separation membrane of the n-th stage water treatment method also, an improvement in product-water quality is attained, for example, by changing the upstream and downstream permeate discharge rates by increasing the rate of discharge from an upstream portion, where the feed water has a low salt concentration and the permeate has a low salt concentration, and reducing the rate of discharge from a downstream portion.

In the case where preference for electric-power cost has been selected, the cost of electric power for the backwashing pump, etc. can be reduced by reducing the period of and flow rates in physical washing steps for the separation membrane of the (n−1)-th stage water treatment method. With respect to the separation membrane of the n-th stage water treatment method also, a reduction in electric-power cost can be attained, for example, by reducing the recovery, since a reduction in recovery makes it possible to lower the pressure for water supply to the separation membrane of the n-th stage water treatment method, i.e., the feed pressure for the high-pressure pump.

In the case where preference for maintaining intervals for separation membrane washing has been selected, the amount of foulants accumulating on the separation membrane of the (n−1)-th stage water treatment method during filtration steps can be reduced by reducing the period of and flow rates in filtration steps, thereby making it possible to maintain intervals for washing of the separation membrane. With respect to the separation membrane of the n-th stage water treatment method in a device where physical washing is conducted, the flow rate in separation membrane washing is increased to enhance the physical washing, thereby discharging the foulants by the physical washing. Thus, intervals for the washing of the separation membrane can be maintained.

Furthermore, in the case where preference for maintaining intervals for separation membrane replacement has been selected, the separation membrane of the (n−1)-th stage water treatment method can be made less apt to suffer chemical deterioration, for example, by reducing the concentration of a cleaning chemical to be injected during a CEB step. Although separation membranes are damaged due to physical deterioration and chemical deterioration to come to be required to be replaced, the intervals for replacing the separation membrane can be thus prolonged. The separation membrane of the n-th stage water treatment method also can be made less apt to suffer chemical deterioration by reducing the concentration of a bactericide or pH regulator in the feed water, thereby prolonging the intervals for replacing the separation membrane.

As described above, the present invention relates to a fresh-water production apparatus including a combination of an (n−1)-th stage water treatment method and an n-th stage water treatment method. It is more preferable that the present invention is applied to a flow in which each of water treatment methods mutually affect as shown below.

Some of treated water obtained by the (n−1)-th stage water treatment method is mixed with treated water obtained by the n-th stage water treatment method.

Some of the treated water obtained by the n-th stage water treatment method is mixed with raw water or with the treated water obtained by the (n−1)-th stage water treatment method.

Some or all of discharged water from the n-th stage water treatment method is mixed with the raw water or with the treated water obtained by the (n−1)-th stage water treatment method.

Some or all of discharged water from the n-th stage water treatment method is used as cleaning water for the (n−1)-th stage water treatment method.

The flow shown above is explained in detail using, as an example, the case where the (n−1)-th stage water treatment method is a membrane separation method in which the separation membrane is a microfiltration membrane and the n-th stage water treatment method also is a membrane separation method in which the separation membrane is a reverse osmosis membrane.

In cases when the properties of the raw water to be treated fluctuate due to seasonal fluctuations, load fluctuations, etc., and when the quality of product water has been specified, there are cases where only some of treated water obtained with the microfiltration membrane is treated with the reverse osmosis membrane and the remainder of the treated water obtained with the microfiltration membrane is mixed with treated water obtained with the reverse osmosis membrane, thereby yielding product water. In such flow, in cases when, for example, the raw water has satisfactory quality or the water treated with the reverse osmosis membrane is satisfactory (e.g., in the winter season), there are often cases where the amount of the water to be treated with the reverse osmosis membrane is reduced in order to lessen the load to be imposed on the reverse osmosis membrane and the water treated with the microfiltration membrane is included in an increased amount into the product water so that the rate of product-water production and the quality thereof are within specified ranges.

In cases when it is difficult to attain the specified product-water quality, there are cases where a flow is employed in which some of the water treated with the reverse osmosis membrane is circulated to the raw water or to the water treated with the microfiltration membrane (feed water for the reverse osmosis membrane) to thereby improve the quality of the feed water for the reverse osmosis membrane and hence improve the quality of the permeate to be obtained with the reverse osmosis membrane.

Furthermore, there are cases where a flow is employed in which some or all of discharged water from the reverse osmosis membrane is added to the raw water to be treated or to the water treated with the microfiltration membrane or to cleaning water such as backwashing water for the microfiltration membrane, etc., thereby improving the proportion (overall recovery) of the amount of the product water to the amount of the raw water in the whole fresh-water production apparatus.

It is more preferable that the present patent is employed in such a flow in which the treated water obtained in the (n−1)-th stage water treatment method and that obtained in the n-th stage water treatment method affect the operation performance in each method in the whole fresh-water production apparatus.

Figure 4:
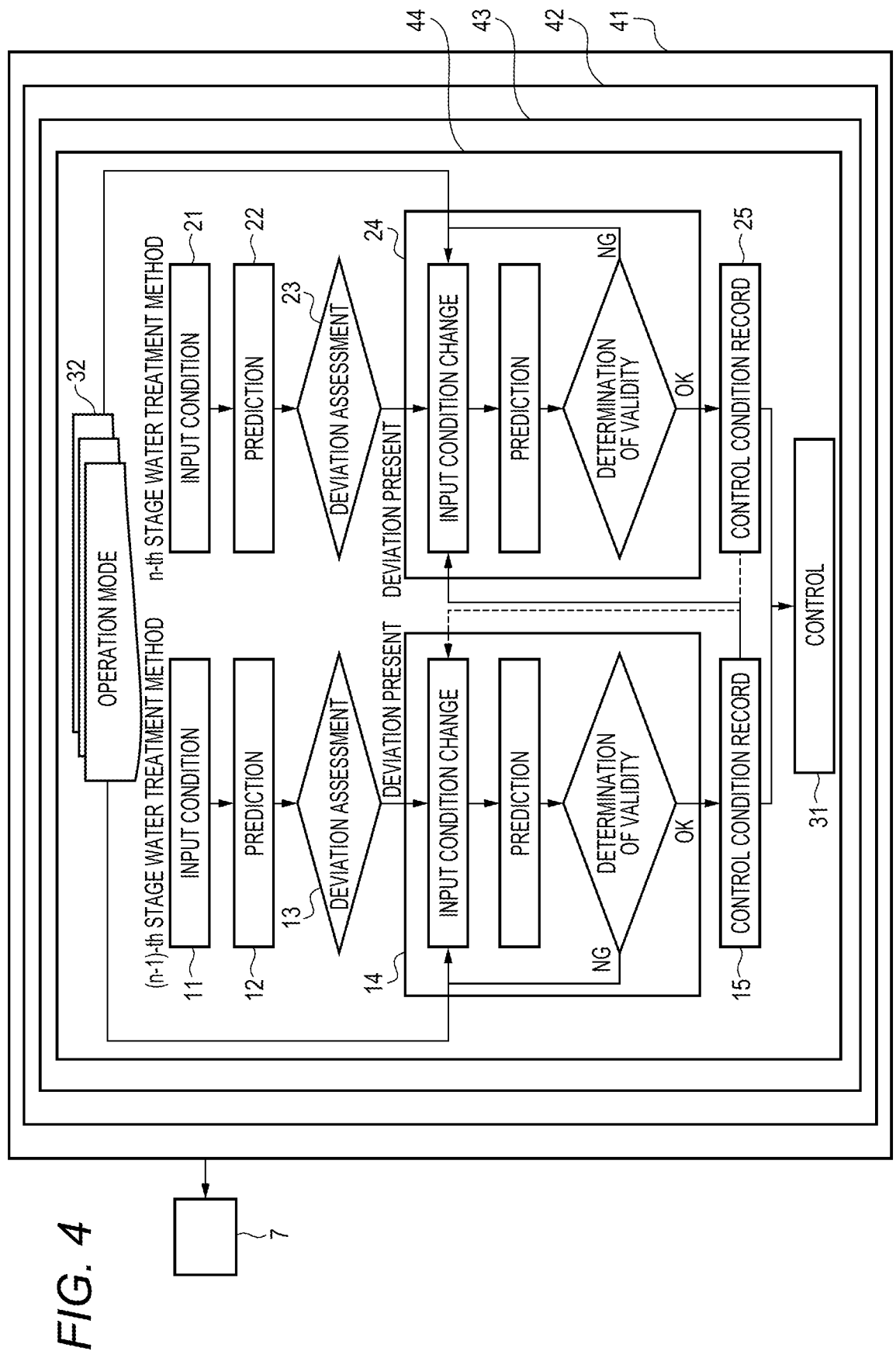
FIG. 4 is a schematic view showing still another embodiment of the present invention.

In a mode of the present invention, the trouble assessment method may be in the form of a computer-readable program as shown in FIG. 4, and the program may be stored in a computer-readable storage medium, which may be utilized in an operation control device 41 to operate a fresh-water production apparatus 7. In this case, the program 44 can be recorded in a storage medium 43, e.g., a hard disk, of a computer 42 or in a storage medium of a control system, e.g., a PLC or a DCS, which is usually provided to fresh-water production apparatuses. Operation data may be taken out of the control system via the internet using a remote monitoring device and stored in a storage medium of either an on-premise server, which is installed in any desired place, or a cloud server.

FIG. 4 shows an operation program for causing a computer to operate a fresh-water production apparatus 7 on the basis of predicted filtration characteristic. The operation program is characterized by including the following steps. The operation program is for operating a fresh-water production apparatus and is for executing the following steps: a filtration-characteristic deviation assessment step for an (n−1)-th stage water treatment method, in which a deviation between predicted filtration characteristic of the (n−1)-th stage water treatment method and filtration characteristic of the (n−1)-th stage water treatment method is assessed; a cyclic prediction calculation step for the (n−1)-th stage water treatment method, in which in cases when a deviation has occurred in the filtration-characteristic deviation assessment step for the (n−1)-th stage water treatment method, the predicted input condition for the (n−1)-th stage water treatment method is changed and a prediction calculation is repeated until the deviation between the predicted filtration characteristic of the (n−1)-th stage water treatment method and filtration characteristic of the (n−1)-th stage water treatment method decreases to or below a specified value; a control condition recording step for the (n−1)-th stage water treatment method, in which control condition for the (n−1)-th stage water treatment method is determined from final input condition obtained in the cyclic prediction calculation step for the (n−1)-th stage water treatment method and is recorded; a cyclic prediction calculation step for an n-th stage water treatment method, in which predicted input condition for the n-th stage water treatment method is changed on the basis of the control condition for the (n−1)-th stage water treatment method and a prediction calculation is repeated until the deviation between predicted filtration characteristic of the n-th stage water treatment method and filtration characteristic of the n-th stage water treatment method decreases to or below the specified value; a control condition recording step for the n-th stage water treatment method, in which control condition for the n-th stage water treatment method is determined from final input condition obtained in the cyclic prediction calculation step for the n-th stage water treatment method and is recorded; and a control step in which the fresh-water production apparatus is controlled on the basis of the control condition recording step for the (n−1)-th stage water treatment method and the control condition recording step for the n-th stage water treatment method.

The operation program shown above is for the case where the filtration-characteristic deviation assessment step for the (n−1)-th stage water treatment method has assessed the occurrence of a deviation in the (n−1)-th stage water treatment method. However, in cases when a deviation has occurred in the filtration-characteristic deviation assessment step for the n-th stage water treatment method, this can be handles with an operation program for the fresh-water production apparatus, which is for executing the following steps: a filtration-characteristic prediction step for the (n−1)-th stage water treatment method, in which filtration characteristic of the (n−1)-th stage water treatment method is predicted from predicted input condition for the (n−1)-th stage water treatment method; a filtration-characteristic prediction step for the n-th stage water treatment method, in which filtration characteristic of the n-th stage water treatment method is predicted from predicted input condition for the n-th stage water treatment method; a filtration-characteristic deviation assessment step for the n-th stage water treatment method, in which a deviation between the predicted filtration characteristic of the n-th stage water treatment method and filtration characteristic of the n-th stage water treatment method is assessed; a cyclic prediction calculation step for the n-th stage water treatment method, in which in cases when a deviation has occurred in the filtration-characteristic deviation assessment step for the n-th stage water treatment method, the predicted input condition for the n-th stage water treatment method is changed and a prediction calculation is repeated until the deviation between the predicted filtration characteristic of the n-th stage water treatment method and filtration characteristic of the n-th stage water treatment method decreases to or below a specified value; a control condition recording step for the n-th stage water treatment method, in which control condition for the n-th stage water treatment method is determined from final input condition obtained in the cyclic prediction calculation step for the n-th stage water treatment method and is recorded; a cyclic prediction calculation step for the (n−1)-th stage water treatment method, in which the predicted input condition for the (n−1)-th stage water treatment method is changed on the basis of the control condition for the n-th stage water treatment method and a prediction calculation is repeated until the deviation between the predicted filtration characteristic of the (n−1)-th stage water treatment method and filtration characteristic of the (n−1)-th stage water treatment method decreases to or below a specified value; a control condition recording step for the (n−1)-th stage water treatment method, in which control condition for the (n−1)-th stage water treatment method is determined from final input condition obtained in the cyclic prediction calculation step for the (n−1)-th stage water treatment method and is recorded; and a control step in which the fresh-water production apparatus is controlled on the basis of the control condition recording step for the (n−1)-th stage water treatment method and the control condition recording step for the n-th stage water treatment method.

More preferred in the present invention is an operation program for the fresh-water production apparatus which is for executing: a step for changing input condition for predicted filtration characteristic of the (n−1)-th stage water treatment method and/or a step for changing input condition for predicted filtration characteristic of the n-th stage water treatment method, on the basis of an operation mode, e.g., any of the operation modes shown in Table 2, selected by an operation mode selection means; and a control step in which the fresh-water production apparatus is controlled on the basis of the control condition recording step for the (n−1)-th stage water treatment method and the control condition recording step for the n-th stage water treatment method.

It is preferable, in the case where the water treatment methods are membrane filtration methods, that control condition to be recorded in the control condition recording steps is selected in accordance with the kinds of the separation membranes used; for example, in cases when the separation membrane in the (n−1)-th stage water treatment method is a microfiltration membrane or an ultrafiltration membrane, then the control condition for the (n−1)-th stage water treatment method is at least any of the following A to C, and in cases when the separation membrane in the n-th stage water treatment method is a reverse osmosis membrane, then the control condition for the n-th stage water treatment method is at least any of the following F to I:

A. period of a filtration step, filtration rate, circulation rate (in the case of cross flow filtration);
B. period of each physical washing step and CEB step, the number of each step, flow rate in each washing, combination of each step, concentration of injected cleaning chemical, kind of cleaning chemical;
C. concentration of added coagulant;
F. at least any of feed-water flow rate, concentrate flow rate, and permeate flow rate, or recovery;
G. ratio between rates of upstream and downstream permeate discharge (in the case of splitting);
H. concentration of injected feed-water scale inhibitor, bactericide, pH regulator, or reducing agent;
I. flow rate, pressure, period and frequency of physical washing (flushing).

The present application is based on Japanese Patent Application No. 2020-023071 filed on Feb. 14, 2020 and Japanese Patent Application No. 2020-057377 filed on Mar. 27, 2020, the disclosures of which are incorporated herein by reference.

REFERENCE SIGNS LIST

1: raw-water tank
2: feed pump
3: first separation membrane device
4: permeate tank
5: high-pressure pump
6: second separation membrane device
7: fresh-water production apparatus
11: predicted input condition for (n−1)-th stage water treatment method
12: filtration-characteristic prediction step for (n−1)-th stage water treatment method
13: filtration-characteristic deviation assessment step for (n−1)-th stage water treatment method
14: cyclic prediction calculation step for (n−1)-th stage water treatment method 15: control condition recording step for (n−1)-th stage water treatment method
21: predicted input condition for n-th stage water treatment method
22: filtration-characteristic prediction step for n-th stage water treatment method
23: filtration-characteristic deviation assessment step for n-th stage water treatment method
24: cyclic prediction calculation step for n-th stage water treatment method
25: control condition recording step for n-th stage water treatment method
31: control output
32: operation mode selection step
41: operation control device
42: computer
43: storage medium
44: program

The invention claimed is:

1. A method of controlling a fresh-water production apparatus for treating a raw water in stages by N-stage (N is a natural number of 2 or larger) water treatment methods, the method comprising:
a filtration-characteristic prediction step for an n-th stage (n is any natural number of 2 to N) water treatment method, wherein a filtration characteristic of the n-th stage water treatment method is predicted from a predicted input condition for the n-th stage;
a filtration-characteristic prediction step for an (n−1)-th stage water treatment method, wherein a filtration characteristic of the (n−1)-th stage water treatment method is predicted from a predicted input condition for the (n−1)-th stage;
a filtration-characteristic deviation assessment step for the n-th stage water treatment method, wherein a deviation between a predicted filtration characteristic of the n-th stage water treatment method and the filtration characteristic of the n-th stage water treatment method is assessed;
a filtration-characteristic deviation assessment step for the (n−1)-th stage water treatment method, wherein a deviation between a predicted filtration characteristic of the (n−1)-th stage water treatment method and the filtration characteristic of the (n−1)-th stage water treatment method is assessed; and
a step group A or a step group B,
wherein the step group A comprises:
a cyclic prediction calculation step for the (n−1)-th stage water treatment method, wherein when the deviation has occurred in the filtration-characteristic deviation assessment step for the (n−1)-th stage water treatment method, the predicted input condition for the (n−1)-th stage water treatment method is changed and a prediction calculation is repeated until the deviation between the predicted filtration characteristic of the (n−1)-th stage water treatment method and the filtration characteristic of the (n−1)-th stage water treatment method decreases to or below a specified value;
a control condition recording step for the (n−1)-th stage water treatment method, wherein a control condition for the (n−1)-th stage water treatment method is determined from a final input condition obtained in the cyclic prediction calculation step for the (n−1)-th stage water treatment method and is recorded;
a cyclic prediction calculation step for the n-th stage water treatment method, wherein the predicted input condition for the n-th stage water treatment method is changed on the basis of the control condition for the (n−1)-th stage water treatment method and a prediction calculation is repeated until the deviation between the predicted filtration characteristic of the n-th stage water treatment method and the filtration characteristic of the n-th stage water treatment method decreases to or below a specified value; and
a control condition recording step for the n-th stage water treatment method, wherein a control condition for the n-th stage water treatment method is determined from a final input condition obtained in the cyclic prediction calculation step for the n-th stage water treatment method and is recorded,
and wherein the step group B comprises:
a cyclic prediction calculation step for the n-th stage water treatment method, wherein when the deviation has occurred in the filtration-characteristic deviation assessment step for the n-th stage water treatment method, the predicted input condition for the n-th stage water treatment method is changed and a prediction calculation is repeated until the deviation between the predicted filtration characteristic of the n-th stage water treatment method and the filtration characteristic of the n-th stage water treatment method decreases to or below a specified value;
a control condition recording step for the n-th stage water treatment method, wherein a control condition for the n-th stage water treatment method is determined from a final input condition obtained in the cyclic prediction calculation step for the n-th stage water treatment method and is recorded;
a cyclic prediction calculation step for the (n−1)-th stage water treatment method, wherein the predicted input condition for the (n−1)-th stage water treatment method is changed on the basis of the control condition for the n-th stage water treatment method and a prediction calculation is repeated until the deviation between the predicted filtration characteristic of the (n−1)-th stage water treatment method and the filtration characteristic of the (n−1)-th stage water treatment method decreases to or below a specified value; and
a control condition recording step for the (n−1)-th stage water treatment method, wherein a control condition for the (n−1)-th stage water treatment method is determined from a final input condition obtained in the cyclic prediction calculation step for the (n−1)-th stage water treatment method and is recorded,
wherein the fresh-water production apparatus is controlled on the basis of the control condition recording step for the (n−1)-th stage water treatment method and the control condition recording step for the n-th stage water treatment method, and
wherein at least any of the N-stage water treatment methods is a membrane separation method and the membrane separation method employs at least one kind of a separation membrane selected from the group consisting of a microfiltration membrane, an ultrafiltration membrane, and a reverse osmosis membrane.

2. The method of controlling a fresh-water production apparatus according to claim 1, further comprising an operation mode selection step for selecting an operation mode, wherein the input condition for filtration-characteristic prediction for each of the N-stage water treatment methods are changed on the basis of the operation mode selected in the operation mode selection step.

3. The method of controlling a fresh-water production apparatus according to claim 1, wherein when the deviation has occurred simultaneously in the filtration-characteristic deviation assessment step for the (n−1)-th stage water treatment method and the filtration-characteristic deviation assessment step for the n-th stage water treatment method, the calculation of the control condition for the (n−1)-th stage water treatment method is preferential.

4. The method of controlling a fresh-water production apparatus according to claim 1, wherein the fresh-water production apparatus has a treatment flow including any of the following:
　some of a treated water obtained by the (n−1)-th stage water treatment method is mixed with a treated water obtained by the n-th stage water treatment method;
　some of the treated water obtained by the n-th stage water treatment method is mixed with the raw water or with the treated water obtained by the (n−1)-th stage water treatment method;
　some or all of a discharged water from the n-th stage water treatment method is mixed with the raw water or with the treated water obtained by the (n−1)-th stage water treatment method; and
　some or all of the discharged water from the n-th stage water treatment method is used as a cleaning water for the (n−1)-th stage water treatment method.

5. The method of controlling a fresh-water production apparatus according to claim 1, wherein the filtration characteristic is at least one kind of a parameter selected from the group consisting of differential pressure, pure-water permeability, and salt permeability.

6. The method of controlling a fresh-water production apparatus according to claim 1, wherein when the (n−1)-th stage water treatment method is a membrane separation method employing a separation membrane which is a microfiltration membrane or an ultrafiltration membrane, then the control condition for the (n−1)-th stage water treatment method is at least one condition selected from the group consisting of the following A to C, and in cases when the n-th stage water treatment method is a membrane separation method employing a separation membrane which is a reverse osmosis membrane, then the control condition for the n-th stage water treatment method is at least one condition selected from the group consisting of the following F to I:
　A. period of a filtration step, filtration rate, circulation rate (in the case of cross flow filtration);
　B. period of each physical washing step and CEB step, the number of each step, flow rate in each washing, combination of each step, concentration of injected cleaning chemical, kind of cleaning chemical;
　C. concentration of added coagulant;
　F. at least any of feed-water flow rate, concentrate flow rate, and permeate flow rate, or recovery;
　G. ratio between rates of upstream and downstream permeate discharge (in the case of splitting);
　H. concentration of injected feed-water scale inhibitor, bactericide, pH regulator, or reducing agent;
　I. flow rate, pressure, period or frequency of physical washing (flushing).

7. The method of controlling a fresh-water production apparatus according to claim 1, the method further comprising a trouble assessment step wherein a trouble in n-th stage water treatment method is assessed from a final predicted input condition obtained in the cyclic prediction calculation step for n-th stage water treatment method.

8. The method of controlling a fresh-water production apparatus according to claim 7, wherein in the cyclic prediction calculation step for n-th stage water treatment method, a predicted input condition for n-th stage water treatment method is changed preferentially using a condition acquired off-line.

9. The method of controlling a fresh-water production apparatus according to claim 8, wherein in the cyclic prediction calculation step for n-th stage water treatment method, the predicted input condition for n-th stage water treatment method is changed preferentially using a condition acquired off-line with respect to each of steps into which the operation of the fresh-water production apparatus has been divided, the condition having been obtained by analyzing changes in filtration characteristic of the steps.

10. A method of controlling a fresh-water production apparatus comprising performing either of the following A and B, on the basis of a result obtained by the method of controlling a fresh-water production apparatus according to claim 7:
　A. to output an alarm for a trouble assessment factor;
　B. to control the trouble assessment factor.

11. A fresh-water production apparatus for treating a raw water in stages by N-stage (N is a natural number of 2 or larger) water treatment methods, comprising:
　a filtration-characteristic prediction means for an n-th stage (n is any natural number of 2 to N) water treatment method, wherein a filtration characteristic of the n-th stage water treatment method is predicted from a predicted input condition for the n-th stage;
　a filtration-characteristic prediction means for an (n−1)-th stage water treatment method, wherein a filtration characteristic of the (n−1)-th stage water treatment method is predicted from a predicted input condition for the (n−1)-th stage;
　a filtration-characteristic deviation assessment means for the n-th stage water treatment method, wherein a deviation between a predicted filtration characteristic of the n-th stage water treatment method and the filtration characteristic of the n-th stage water treatment method is assessed;
　a filtration-characteristic deviation assessment means for the (n−1)-th stage water treatment method, wherein a deviation between a predicted filtration characteristic of the (n−1)-th stage water treatment method and the filtration characteristic of the (n−1)-th stage water treatment method is assessed; and
　a means group A or a means group B,
　wherein the means group A comprises:
　a cyclic prediction calculation means for the (n−1)-th stage water treatment method, wherein when the deviation has occurred in the filtration-characteristic deviation assessment means for the (n−1)-th stage water treatment method, the predicted input condition for the (n−1)-th stage water treatment method is changed and a prediction calculation is repeated until the deviation between the predicted filtration characteristic of the (n−1)-th stage water treatment method and the filtration characteristic of the (n−1)-th stage water treatment method decreases to or below a specified value;
　a control condition recording means for the (n−1)-th stage water treatment method, wherein a control condition for the (n−1)-th stage water treatment method is determined from a final input condition obtained in the cyclic prediction calculation means for the (n−1)-th stage water treatment method and is recorded;
　a cyclic prediction calculation means for the n-th stage water treatment method, wherein the predicted input condition for the n-th stage water treatment method is changed on the basis of the control condition for the (n-1)-th stage water treatment method and a prediction calculation is repeated until the deviation between the predicted filtration characteristic of the n-th stage water treatment method and the filtration characteristic of the n-th stage water treatment method decreases to or below a specified value;

a control condition recording means for the n-th stage water treatment method, wherein a control condition for the n-th stage water treatment method is determined from a final input condition obtained in the cyclic prediction calculation means for the n-th stage water treatment method and is recorded; and a control means of controlling the fresh-water production apparatus on the basis of the control condition recording means for the (n-1)-th stage water treatment method and the control condition recording means for the n-th stage water treatment method, and wherein the means group B comprises:

a cyclic prediction calculation means for the n-th stage water treatment method, wherein when the deviation has occurred in the filtration-characteristic deviation assessment means for the n-th stage water treatment method, the predicted input condition for the n-th stage water treatment method is changed and a prediction calculation is repeated until the deviation between the predicted filtration characteristic of the n-th stage water treatment method and the filtration characteristic of the n-th stage water treatment method decreases to or below a specified value;

a control condition recording means for the n-th stage water treatment method, wherein a control condition for the n-th stage water treatment method is determined from a final input condition obtained in the cyclic prediction calculation means for the n-th stage water treatment method and is recorded;

a cyclic prediction calculation means for the (n-1)-th stage water treatment method, wherein the predicted input condition for the (n-1)-th stage water treatment method is changed on the basis of the control condition for the n-th stage water treatment method and a prediction calculation is repeated until the deviation between the predicted filtration characteristic of the (n-1)-th stage water treatment method and the filtration characteristic of the (n-1)-th stage water treatment method decreases to or below a specified value;

a control condition recording means for the (n-1)-th stage water treatment method, wherein a control condition for the (n-1)-th stage water treatment method is determined from a final input condition obtained in the cyclic prediction calculation means for the (n-1)-th stage water treatment method and is recorded; and a control means of controlling the fresh-water production apparatus on the basis of the control condition recording means for the (n-1)-th stage water treatment method and the control condition recording means for the n-th stage water treatment method, and wherein at least any of the N-stage water treatment methods is a membrane separation method and the membrane separation method employs at least one kind of a separation membrane selected from the group consisting of a microfiltration membrane, an ultrafiltration membrane, and a reverse osmosis membrane.

12. The fresh-water production apparatus according to claim 11, comprising:

an operation mode selection means which selects an operation mode;

a cyclic prediction calculation means for each of the N-stage water treatment methods which changes the input condition for filtration-characteristic prediction for each of the N-stage water treatment methods on the basis of the operation mode selected by the operation mode selection means and repeats a prediction calculation until the derivation between a predicted filtration characteristic of each of the N-stage water treatment methods and a filtration characteristic of each of the N-stage water treatment methods decreases to or below a specified value; and a control means which controls the fresh-water production apparatus on the basis of a control condition recording means for each of the N-stage water treatment methods which determines a control condition for each of the N-stage water treatment methods from a final input condition obtained by the cyclic prediction calculation means for each of the N-stage water treatment methods and records the control condition.

13. The fresh-water production apparatus according to claim 11, having a treatment flow including any of the following:

some of a treated water obtained by the (n-1)-th stage water treatment method is mixed with a treated water obtained by the n-th stage water treatment method;

some of the treated water obtained by the n-th stage water treatment method is mixed with the raw water or with the treated water obtained by the (n-1)-th stage water treatment method;

some or all of a discharged water from the n-th stage water treatment method is mixed with the raw water or with the treated water obtained by the (n-1)-th stage water treatment method; and some or all of the discharged water from the n-th stage water treatment method is used as cleaning water for the (n-1)-th stage water treatment method.

14. The fresh-water production apparatus according to claim 13, wherein when the (n-1)-th stage water treatment method is a membrane separation method employing a separation membrane which is a microfiltration membrane or an ultrafiltration membrane, then the control condition for the (n-1)-th stage water treatment method is at least one condition selected from the group consisting of the following A to C, and in cases when the n-th stage water treatment method is a membrane separation method employing a separation membrane which is a reverse osmosis membrane, then the control condition for the n-th stage water treatment method is at least one condition selected from the group consisting of the following F to I:

A. period of a filtration step, filtration rate, circulation rate (in the case of cross flow filtration);

B. period of each physical washing step and CEB step, the number of each step, flow rate in each washing, combination of each step, concentration of injected cleaning chemical, kind of cleaning chemical;

C. concentration of added coagulant;

F. at least any of feed-water flow rate, concentrate flow rate, and permeate flow rate, or recovery;

G. ratio between rates of upstream and downstream permeate discharge (in the case of splitting);

H. concentration of injected feed-water scale inhibitor, bactericide, pH regulator, or reducing agent;

I. flow rate, pressure, period or frequency of physical washing (flushing).

15. The fresh-water production apparatus according to claim 11, comprising a trouble assessment means which assesses a trouble from the final input condition obtained by the cyclic prediction calculation means for each of the N-stage water treatment methods.

16. A fresh-water production apparatus comprising an alarm output/control means which outputs an alarm for a trouble factor or controls the trouble factor, on the basis of a result obtained by the trouble assessment means for each of the N-stages according to claim 15.

17. An operation program for a fresh-water production apparatus for treating a raw water in stages by N-stage (N is a natural number of 2 or larger) water treatment methods, the operation program causing a computer to execute the following steps in order to operate the fresh-water production apparatus:
a filtration-characteristic prediction step for an n-th stage (n is any natural number of 2 to N) water treatment method, wherein a filtration characteristic of the n-th stage water treatment method is predicted from a predicted input condition for the n-th stage;
a filtration-characteristic prediction step for an (n−1)-th stage water treatment method, wherein a filtration characteristic of the (n−1)-th stage water treatment method is predicted from a predicted input condition for the (n−1)-th stage;
a filtration-characteristic deviation assessment step for the n-th stage water treatment method, wherein a deviation between a predicted filtration characteristic of the n-th stage water treatment method and the filtration characteristic of the n-th stage water treatment method is assessed;
a filtration-characteristic deviation assessment step for the (n−1)-th stage water treatment method, wherein a deviation between a predicted filtration characteristic of the (n−1)-th stage water treatment method and the filtration characteristic of the (n−1)-th stage water treatment method is assessed; and
a step group A or a step group B,
wherein the step group A comprises:
a cyclic prediction calculation step for the (n−1)-th stage water treatment method, wherein when the deviation has occurred in the filtration-characteristic deviation assessment step for the (n−1)-th stage water treatment method, the predicted input condition for the (n−1)-th stage water treatment method is changed and a prediction calculation is repeated until the deviation between the predicted filtration characteristic of the (n−1)-th stage water treatment method and the filtration characteristic of the (n−1)-th stage water treatment method decreases to or below a specified value;
a control condition recording step for the (n−1)-th stage water treatment method, wherein a control condition for the (n−1)-th stage water treatment method is determined from a final input condition obtained in the cyclic prediction calculation step for the (n−1)-th stage water treatment method and is recorded;
a cyclic prediction calculation step for the n-th stage water treatment method, wherein the predicted input condition for the n-th stage water treatment method is changed on the basis of the control condition for the (n−1)-th stage water treatment method and a prediction calculation is repeated until the deviation between the predicted filtration characteristic of the n-th stage water treatment method and the filtration characteristic of the n-th stage water treatment method decreases to or below a specified value;
a control condition recording step for the n-th stage water treatment method, wherein a control condition for the n-th stage water treatment method is determined from a final input condition obtained in the cyclic prediction calculation step for the n-th stage water treatment method and is recorded; and
a control step wherein the fresh-water production apparatus is controlled on the basis of the control condition recording step for the (n−1)-th stage water treatment method and the control condition recording step for the n-th stage water treatment method,
and wherein the step group B comprises:
a cyclic prediction calculation step for the n-th stage water treatment method, wherein when the deviation has occurred in the filtration-characteristic deviation assessment step for the n-th stage water treatment method, the predicted input condition for the n-th stage water treatment method is changed and a prediction calculation is repeated until the deviation between the predicted filtration characteristic of the n-th stage water treatment method and the filtration characteristic of the n-th stage water treatment method decreases to or below a specified value;
a control condition recording step for the n-th stage water treatment method, wherein a control condition for the n-th stage water treatment method is determined from a final input condition obtained in the cyclic prediction calculation step for the n-th stage water treatment method and is recorded;
a cyclic prediction calculation step for the (n−1)-th stage water treatment method, wherein the predicted input condition for the (n−1)-th stage water treatment method is changed on the basis of the control condition for the n-th stage water treatment method and a prediction calculation is repeated until the deviation between the predicted filtration characteristic of the (n−1)-th stage water treatment method and the filtration characteristic of the (n−1)-th stage water treatment method decreases to or below a specified value;
a control condition recording step for the (n−1)-th stage water treatment method, wherein a control condition for the (n−1)-th stage water treatment method is determined from a final input condition obtained in the cyclic prediction calculation step for the (n−1)-th stage water treatment method and is recorded; and
a control step wherein the fresh-water production apparatus is controlled on the basis of the control condition recording step for the (n−1)-th stage water treatment method and the control condition recording step for the n-th stage water treatment method, and
wherein at least any of the N-stage water treatment methods is a membrane separation method and the membrane separation method employs at least one kind of a separation membrane selected from the group consisting of a microfiltration membrane, an ultrafiltration membrane, and a reverse osmosis membrane.

18. The operation program according to claim 17 for a fresh-water production apparatus for treating a raw water in stages by N-stage (N is a natural number of 2 or larger) water treatment methods,
the operation program for the fresh-water production apparatus having an operation mode selection step for selecting an operation mode, and the operation program causing a computer to execute the following steps in order to operate the fresh-water production apparatus:
a cyclic prediction calculation step for the (n−1)-th stage water treatment method, wherein the predicted input condition for the (n−1)-th stage water treatment method is changed on the basis of an operation mode selected in the operation mode selectin step and a prediction calculation is repeated until the deviation between the predicted filtration characteristic of the (n−1)-th stage water treatment method and the filtration characteristic of the (n−1)-th stage water treatment method is eliminated;

a cyclic prediction calculation step for the n-th stage water treatment method, wherein the predicted input condition for the n-th stage water treatment method is changed on the basis of the operation mode selected in the operation mode selection step and a prediction calculation is repeated until the deviation between the predicted filtration characteristic of the n-th stage water treatment method and the filtration characteristic of the n-th stage water treatment method is eliminated;

a control condition recording step for the (n−1)-th stage water treatment method, wherein a control condition for the (n−1)-th stage water treatment method is determined from a final input condition obtained in at least the cyclic prediction calculation step for the (n−1)-th stage water treatment method, of the cyclic prediction calculation steps respectively for the (n−1)-th stage water treatment method and the n-th stage water treatment method, and is recorded; and a control step wherein the fresh-water production apparatus is controlled on the basis of the control condition recording step for the (n−1)-th stage water treatment method.

19. The operation program according to claim 17 for a fresh-water production apparatus for treating a raw water in stages by N-stage (N is a natural number of 2 or larger) water treatment methods, the operation program for the fresh-water production apparatus having an operation mode selection step for selecting an operation mode, and the operation program causing a computer to execute the following steps in order to operate the fresh-water production apparatus:

a cyclic prediction calculation step for the (n−1)-th stage water treatment method, wherein the predicted input condition for the (n−1)-th stage water treatment method is changed on the basis of an operation mode selected in the operation mode selectin step and a prediction calculation is repeated until the deviation between the predicted filtration characteristic of the (n−1)-th stage water treatment method and the filtration characteristic of the (n−1)-th stage water treatment method is eliminated;

a cyclic prediction calculation step for the n-th stage water treatment method, wherein the predicted input condition for the n-th stage water treatment method is changed on the basis of the operation mode selected in the operation mode selection step and a prediction calculation is repeated until the deviation between the predicted filtration characteristic of the n-th stage water treatment method and the filtration characteristic of the n-th stage water treatment method is eliminated;

a control condition recording step for the n-th stage water treatment method, wherein a control condition for the n-th stage water treatment method is determined from a final input condition obtained in at least the cyclic prediction calculation step for the n-th stage water treatment method, of the cyclic prediction calculation steps respectively for the (n−1)-th stage water treatment method and the n-th stage water treatment method, and is recorded; and a control step wherein the fresh-water production apparatus is controlled on the basis of the control condition recording step for the n-th stage water treatment method.

20. The operation program according to claim 17 for a fresh-water production apparatus for treating a raw water in stages by N-stage (N is a natural number of 2 or larger) water treatment methods, wherein when the (n−1)-th stage water treatment method is a membrane separation method employing a separation membrane which is a microfiltration membrane or an ultrafiltration membrane, then the control condition to be recorded in the control condition recording step for the (n−1)-the stage water treatment method is at least one condition selected from the group consisting of the following A to C, and in cases when the n-th stage water treatment method is a membrane separation method employing a separation membrane which is a reverse osmosis membrane, then the control condition to be recorded in the control condition recording step for the n-the stage water treatment method is at least one condition selected from the group consisting of the following F to I, the operation program causing a computer to execute a control step wherein the fresh-water production apparatus is controlled on the basis of the control condition recording step for the (n−1)-th stage water treatment method and the control condition recording step for the n-th stage water treatment method:

A. period of a filtration step, filtration rate, circulation rate (in the case of cross flow filtration);

B. period of each physical washing step and CEB step, the number of each step, flow rate in each washing, combination of each step, concentration of injected cleaning chemical, kind of cleaning chemical;

C. concentration of added coagulant;

F. at least any of feed-water flow rate, concentrate flow rate, and permeate flow rate, or recovery;

G. ratio between rates of upstream and downstream permeate discharge (in the case of splitting);

H. concentration of injected feed-water scale inhibitor, bactericide, pH regulator, or reducing agent;

I. flow rate, pressure, period or frequency of physical washing (flushing).

21. The operation program for a fresh-water production apparatus according to claim 17, the operation program causing a computer to execute a trouble assessment step wherein a trouble is assessed from a final predicted input condition obtained in the cyclic prediction calculation step for n-th stage water treatment method.

22. The operation program for a fresh-water production apparatus according to claim 21, causing a computer to execute a condition changing step wherein a condition acquired off-line is preferentially used for changing the predicted input condition in the cyclic prediction calculation step for n-th stage.

23. The operation program for a fresh-water production apparatus according to claim 22, causing a computer to execute a filtration-characteristic analysis step wherein a change in filtration characteristic is analyzed with respect to each of steps into which the operation of the fresh-water production apparatus has been divided, in order to change the predicted input condition in the cyclic prediction calculation step for n-th stage.

24. An operation program for a fresh-water production apparatus, the program causing a computer to execute at least either of the following steps of A and B, in order to operate the fresh-water production apparatus, in accordance with a result obtained by the operation program according to claim 21:
- A. an alarm output step in which an alarm for a trouble assessment factor is outputted;
- B. a control step in which the trouble assessment factor is controlled.

25. A storage medium readable with a computer, storing the program according to claim 17.

26. The method of controlling a fresh-water production apparatus according to claim 1, wherein the step group A is selected.

27. The method of controlling a fresh-water production apparatus according to claim 1, wherein the step group B is selected.

28. The fresh-water production apparatus according to claim 11, wherein the means group A is selected.

29. The fresh-water production apparatus according to claim 11, wherein the means group B is selected.

30. The operation program according to claim 17, wherein the step group A is selected.

31. The operation program according to claim 17, wherein the step group B is selected.

* * * * *

UNITED STATES PATENT AND TRADEMARK OFFICE
CERTIFICATE OF CORRECTION

| | | |
|---|---|---|
| PATENT NO. | : 12,415,736 B2 | Page 1 of 1 |
| APPLICATION NO. | : 17/798982 | |
| DATED | : September 16, 2025 | |
| INVENTOR(S) | : Kazunori Tomioka, Kazuki Hagawa and Hiroshi Hamada | |

It is certified that error appears in the above-identified patent and that said Letters Patent is hereby corrected as shown below:

In the Claims

In Column 40, Line 7 in Claim 12, the phrase "the derivation between" should read -- the deviation between --.

In Column 40, Line 38 in Claim 14, the phrase "claim 13," should read -- claim 11, --.

In Column 42, Line 67 in Claim 18, the phrase "mode selectin step" should read -- mode selection step --.

In Column 43, Line 43 in Claim 19, the phrase "mode selectin step" should read -- mode selection step --.

In Column 44, Line 14 in Claim 20, the phrase "the (n–1)-the stage" should read -- the (n–1)-th stage --.

In Column 44, Line 21 in Claim 20, the phrase "the n-the stage" should read -- the n-th stage --.

Signed and Sealed this
Twenty-third Day of December, 2025

John A. Squires
*Director of the United States Patent and Trademark Office*